(12) United States Patent
Ishii et al.

(10) Patent No.: US 7,684,382 B2
(45) Date of Patent: Mar. 23, 2010

(54) PROVIDER NETWORK FOR PROVIDING L-2 VPN SERVICES AND EDGE ROUTER

(75) Inventors: Kenichi Ishii, Yokohama (JP); Hiroki Takaki, Yokohama (JP); Colin Peters, Yokohama (JP); Shinichi Kuranari, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 709 days.

(21) Appl. No.: 11/025,277

(22) Filed: Dec. 29, 2004

(65) Prior Publication Data

US 2006/0056384 A1 Mar. 16, 2006

(30) Foreign Application Priority Data

Sep. 16, 2004 (JP) ............................. 2004-270364

(51) Int. Cl.
*H04L 12/28* (2006.01)
(52) U.S. Cl. ...................................... 370/351; 370/401
(58) Field of Classification Search ................. 370/225, 370/232, 235, 241, 248, 386, 389, 392, 395.54, 370/100; 707/100; 709/220, 223, 224, 231, 709/232, 236, 238–240
See application file for complete search history.

(56) References Cited

U.S. PATENT DOCUMENTS

| | | | |
|---|---|---|---|
| 6,836,466 B1 * | 12/2004 | Kant et al. | 370/252 |
| 6,954,789 B2 * | 10/2005 | Dietz et al. | 709/224 |
| 2003/0128668 A1 * | 7/2003 | Yavatkar et al. | 370/238 |
| 2004/0047349 A1 * | 3/2004 | Fujita et al. | 370/389 |
| 2004/0258056 A1 * | 12/2004 | Ishihara et al. | 370/386 |
| 2005/0053054 A1 * | 3/2005 | Das et al. | 370/352 |
| 2006/0101026 A1 * | 5/2006 | Fukushima | 707/100 |

FOREIGN PATENT DOCUMENTS

| | | |
|---|---|---|
| JP | 08-249249 | 9/1996 |
| JP | 2001-326638 | 11/2001 |

OTHER PUBLICATIONS

Notification of Reason for Rejection dated Dec. 1, 2009, for corresponding Japanese Application No. JP 2004-270364.

* cited by examiner

*Primary Examiner*—Ricky Ngo
*Assistant Examiner*—David Oveissi
(74) *Attorney, Agent, or Firm*—Katten Muchin Rosenman LLP

(57) ABSTRACT

The provider network that interconnects user networks includes a plurality of edge routers. At least one of the plurality of edge routers includes an obtaining unit for obtaining information of a packet transferred by the edge router itself, a creating unit for creating a flow list in which flow information of packets transferred from the user network side to the provider network side is registered based on the packet information, a monitoring unit for monitoring a traffic state of a flow of each packet registered in the flow list based on information of packets transferred from the provider network to the user network, and a notifying unit for notifying the traffic state of the flow registered in the flow list to a maintenance engineer.

15 Claims, 21 Drawing Sheets

FIG. 4

FLOW LIST (PE-1)

121

| No. | MAC SOURCE ADDRESS | MAC DESTINATION ADDRESS | TRANSMISSION TIME | STATE |
|---|---|---|---|---|
| 1 | 01-01-01-01-01-01 (T-1) | 03-03-03-03-03-03 (T-3) | 2004/05/25. 17:15:48 | NORMAL TRAFFIC |
| 2 | 01-01-01-01-01-01 (T-1) | 04-04-04-04-04-04 (T-4) | 2004/05/25. 17:20:02 | TRAFFIC IS BEING CHECKED |
| 3 | 02-02-02-02-02-02 (T-2) | 03-03-03-03-03-03 (T-3) | 2004/05/25. 12:30:19 | NORMAL TRAFFIC |
| 4 | 02-02-02-02-02-02 (T-2) | 04-04-04-04-04-04 (T-4) | 2004/05/25. 16:05:22 | ABNORMAL TRAFFIC |

FIG. 9

L2 LABEL DATABASE (PE-1)

| No. | RECEIVING PORT NUMBER | VLAN-Tag | VLAN-ID | L2 LABEL | OPPOSITE EDGE ROUTER DESTINATION IP ADDRESS |
|---|---|---|---|---|---|
| 1 | 100 (T-1 CONNECTION) | 123 (T-3 DIRECTED) | 123 | 1230 | 22.22.22.22 (PE-2) |
| 2 | 100 (T-1 CONNECTION) | 124 (T-4 DIRECTED) | 124 | 1240 | 22.22.22.22 (PE-2) |
| 3 | 200 (T-1 CONNECTION) | 123 (T-3 DIRECTED) | 123 | 1230 | 22.22.22.22 (PE-2) |
| 4 | 200 (T-2 CONNECTION) | 124 (T-4 DIRECTED) | 124 | 1240 | 22.22.22.22 (PE-2) |
| 5 | 505 (T-5 CONNECTION) | ------ | 50 | 5000 | 22.22.22.22 (PE-2) |
| 6 | 506 (T-6 CONNECTION) | ------ | 50 | 5000 | 22.22.22.22 (PE-2) |

T-1 TO T-4 ARE EXAMPLES OF TAG VLAN
T-5, T-6 ARE EXAMPLES OF PORT VLAN (UNUSED)

FIG. 10

FLOW LIST (ROUTE PATTERN ADDITION) (PE-1)

221

| No. | ROUTE PATTERN | | | MAC SOURCE ADDRESS | MAC DESTINATION ADDRESS | TRANSMISSION TIME | STATE |
|---|---|---|---|---|---|---|---|
| | TRANSMISSION PORT NUMBER | L1 LABEL | L2 LABEL | | | | |
| 1 | 111 (R-1 CONNECTION) | 10000 | 1230 | 01-01-01-01-01-01 (T-1) | 03-03-03-03-03-03 (T-3) | 2004/05/25. 17:15:48 | NORMAL TRAFFIC |
| 2 | 111 (R-1 CONNECTION) | 10000 | 1240 | 01-01-01-01-01-01 (T-1) | 04-04-04-04-04-04 (T-4) | 2004/05/25. 17:20:02 | TRAFFIC IS BEING CHECKED |
| 3 | 113 (R-3 CONNECTION) | 30000 | 1240 | 02-02-02-02-02-02 (T-2) | 04-04-04-04-04-04 (T-4) | 2004/05/25. 16:05:22 | ABNORMAL TRAFFIC |

FIG. 11

L1 LABEL DATABASE (PE-1)

| No. | OPPOSITE EDGE ROUTER DESTINATION IP ADDRESS | HASH VALUE OF MAC ADDRESS | L1 LABEL | TRANSMISSION PORT | MAC ADDRESS OF NEXT HOP ROUTER |
|---|---|---|---|---|---|
| 1 | 22.22.22.22 (PE-2) | 1-5 | 10000 | 111 (R-1 CONNECTION) | 11-11-11-11-11-11 (R-1) |
| 2 | 22.22.22.22 (PE-2) | 6-10 | 30000 | 113 (R-3 CONNECTION) | 33-33-33-33-33-33 (R-3) |

FIG. 14

FLOW LIST (L2 LABEL ADDED) (PE-1)

| No. | MAC SOURCE ADDRESS | MAC DESTINATION ADDRESS | L2 LABEL | TRANSMISSION TIME | STATE |
|---|---|---|---|---|---|
| 1 | 01-01-01-01-01-01 (T-1) | 03-03-03-03-03-03 (T-3) | 1230 | 2004/05/25. 17:15:48 | NORMAL TRAFFIC |
| 2 | 01-01-01-01-01-01 (T-1) | 04-04-04-04-04-04 (T-4) | 1240 | 2004/05/25. 17:20:02 | TRAFFIC IS BEING CHECKED |
| 3 | 02-02-02-02-02-02 (T-2) | 03-03-03-03-03-03 (T-3) | 1230 | 2004/05/25. 12:30:19 | NORMAL TRAFFIC |
| 4 | 02-02-02-02-02-02 (T-2) | 04-04-04-04-04-04 (T-4) | 1240 | 2004/05/25. 16:05:22 | ABNORMAL TRAFFIC |

L2 LABEL OPPOSITE ROUTER DATABASE (PE-2)

| No. | ROUTER ITSELF RECEPTION L2 LABEL | OPPOSITE EDGE ROUTER DESTINATION IP ADDRESS | OPPOSITE ROUTER TRANSMISSION L2 LABEL |
|---|---|---|---|
| 1 | 1230 | 11.11.11.11 (PE-1) | 1231 |
| 2 | 1240 | 11.11.11.11 (PE-1) | 1241 |

FIG. 16

L1 LABEL DATABASE (PE-2)

| No. | OPPOSITE EDGE ROUTER DESTINATION IP ADDRESS | HASH VALUE OF MAC ADDRESS | L1 LABEL | TRANSMISSION PORT | MAC ADDRESS OF NEXT HOP ROUTER |
|---|---|---|---|---|---|
| 1 | 11.11.11.11 (PE-1) | 1-5 | 20000 | 222 (R-2 CONNECTION) | 22-22-22-22-22-22 (R-2) |
| 2 | 11.11.11.11 (PE-1) | 6-10 | 40000 | 224 (R-4 CONNECTION) | 44-44-44-44-44-44 (R-4) |

PROVIDER NETWORK FOR PROVIDING L-2 VPN SERVICES AND EDGE ROUTER

BACKGROUND OF THE INVENTION

1. Field of the Invention

The present invention relates to a traffic checking/state monitoring system of a forwarding plane (packet transfer function through full wire not by software but by packet transfer only hardware) of a router which constitutes a Layer 2-Virtual Private Network (L2-VPN).

2. Description of the Related Art

In recent years, at corporations or the like whose bases are dispersed to several places, a form has increasingly been taken to interconnect the bases of the places through an Internet network, and to virtually build one local area network (L2-VPN). This has been accompanied by a rapid increase in the number of providers for rendering L2-VPN connection services.

The L2-VPN is a VPN through which the provider offers a layer 2 connection between customer sites. In the L2-VPN, a provider network which renders VPN services interconnects user networks equivalent to the customer sites.

A provider edge router (PE) is arranged in a boundary between the provider network and the user network. The Provider edge router relays communication from the user network, and transfers it into the provider network. The provider which renders connection services of Layer 2 always monitors whether the user network can communication with the opposite user network or not through the Provider edge router.

Additionally, in the case of adding a new communication device in the user network, the provider checks whether the new communication device can communicate with a communication device in the opposite user network or not through the Provider edge router by a control plane (series of control operations for signaling, saving and updating of routing information, and setting of a forwarding path).

However, in actual communication between the user networks, data transfer is executed by a forwarding plane. Consequently, it is necessary to check, not only in the case of the control plane but also in the case of the forwarding plane, whether actual user communication is normal or not.

Generally, as shown in FIG. 20, a recent router includes a packet transfer control unit different from a protocol control unit. Thus, to enable the Provider edge router that includes the protocol control unit and the packet transfer control unit to check normality of communication with the opposite user network, the Provider edge router must actually send a communication packet from the user network side to the opposite user network. Moreover, using a packet internet grouper (ping), traffic checking must be carried out by a terminal connected to the Provider edge router directly or through an L2 switch.

The provider network may be constituted by using Multi Protocol Label Switching (MPLS). FIG. 21 shows an example of a provider network to which the MPLS is applied. In this case, there are a plurality of packet reaching paths between a Provider edge router (e.g., PE-1) and an opposite Provider edge router (e.g., PE-2).

Additionally, in the provider network, depending on Equal Cost Multi-Path (ECMP) services, each router that relays a packet may use a plurality of paths for load dispersion. Accordingly, there is a large amount of a forwarding plane in the provider network.

In the traffic checking that uses the ping as described above, a Media Access Control (MAC) address of the terminal is used for reaching path determination. Thus, a part of the forwarding plane actually used by a user cannot be checked. Consequently, to check normality of all the forwarding planes used by the user, the following means (1) or (2) must be employed.

(1) All the terminals in the user network execute communication of ping or the like with all the terminals in the opposite user network, and checking is carried out at each terminal in the user network. In an example shown in FIG. 21, there are terminals T-1 and T-2 in the user network A, and there are terminals T-3 and T-4 in the user network B. The terminal T-1 of the user network A transmits a ping packet to each of the terminals T-3 and T-4 of the opposite user network B. The terminal T-2 also transmits a ping packet to each of the terminals T-3 and T-4. The terminal T-1 can check normality of a forwarding plane on a transmission route of each ping packet which reaches each of the terminals T-3 and T-4 from the terminal T-1 by receiving a response packet of each ping packet. The terminal T-2 can check normality of a forwarding plane on a transmission route of each ping packet which reaches each of the terminals T-3 and T-4 from the terminal T-2 by receiving a response packet of each ping packet.

(2) Testing devices that can freely create, transmit and receive communication packets are installed in the user network and the opposite user network, communication is carried out for all forwarding planes between the testing devices, and checking is executed at the two testing devices.

However, in the case of the means (1), the terminals in the user network are under user's management. Consequently, the provider cannot freely operate the terminals. Besides, for each addition of a terminal in the user network, the added terminal must execute ping for each terminal in the opposite user network. Consequently, enormous management costs are necessary.

Additionally, in the case of the means (2), there is a problem in that it is difficult to install a testing device prepared by the provider for the user network therein. Since expensive testing devices are necessary in all the user networks, enormous equipment costs are necessary.

Therefore, in the present circumstances, a method is employed which executes ping or the like at the Provider edge router, and checks a forwarding plane of a core router (router in provider network: routers R-1 to R-4 in FIG. 21) only. Alternatively, a method is employed which checks traffic of only a part of a forwarding plane including the edge router by a small number of terminals connected to the Provider edge router. In other words, normality of all the forwarding planes through which user's traffic passes is not carried out. In the present circumstances, monitoring of normality is executed only for a control plane.

Incidentally, as a prior art concerning the present invention, for example, there are a monitoring device, a monitoring method and a recording medium disclosed in Patent document 1.

[Patent document 1] JP 2001-326638 A

As described above, the normality checking of the forwarding plane in the prior art has been carried out only for the transfer by the core router. Alternatively, the normality checking of the forwarding plane has been carried out only for a part of routes in all the forwarding planes. Consequently, when an abnormality occurs in communication of the forwarding plane while the control plane is normal, a maintenance engineer cannot recognize the abnormality of the forwarding plane, and early discovery of the communication abnormality is impossible.

SUMMARY OF THE INVENTION

It is an object of the present invention to provide a technology which enables an edge router to check normality of traffic of a forwarding plane concerning all packet flows through the router in a provider network for rendering layer 2 connection services between user networks.

The present invention adopts the following configurations. That is, a first aspect of the present invention relates to a provider network which includes a plurality of edge routers arranged in a boundary between user networks and renders layer 2 connection services between the user networks, in which at least one of the plurality of edge routers includes:

transfer means for receiving a packet transmitted between the user networks and transferring the packet;

obtaining means for obtaining information in the packet transferred by the transfer means;

creating means for creating a flow list in which flow information indicating a flow of a packet transferred from a user network side to a provider network side is registered based on the information obtained from the packet by the obtaining means;

monitoring means for monitoring a traffic state of the flow of the packet registered in the flow list based on information obtained by the obtaining means from a packet transferred from the provider network side to the user network side; and output means for outputting the flow traffic state of the packet registered in the flow list to an outside.

Further, a second aspect of the present invention relates to an edge router arranged in a boundary between a provider network which renders layer 2 connection services between user networks and one of the user networks, comprising:

transfer means for receiving a packet transmitted between one of the user networks and the other of the user networks and transferring the packet;

obtaining means for obtaining information in each packet transferred by the transfer means;

creating means for creating a flow list in which flow information indicating a flow of a packet transferred from one of the user network to the provider network is registered based on the information obtained from the packet by the obtaining means;

monitoring means for monitoring a flow traffic state of the flow of the packet registered in the flow list based on information obtained by the obtaining means from a packet transferred from the provider network to one of the user networks; and output means for outputting the flow traffic state of the packet registered in the flow list to an outside.

A third aspect of the present invention relates to a packet flow traffic checking method for an edge router arranged in a boundary between a provider network which renders layer 2 connection services between user networks and one of the user networks, including causing the edge router to:

obtain information in a transferred packet when receiving the packet transmitted between one of the user networks and the other of the user networks and transferring the packet;

create a flow list in which flow information indicating a flow of a packet transferred from one of the user networks to the provider network is registered based on the information of the packet;

monitor a traffic state of the flow of the packet registered in the flow list based on information of a packet transferred from the provider network to one of the user networks; and output the flow traffic state of the packet registered in the flow list to an outside.

According to the present invention, the edge router can check normality of traffic of a forwarding plane concerning all packet flows through the router in the provider network for rendering layer 2 connection services between user networks.

BRIEF DESCRIPTION OF THE DRAWINGS

FIG. 4 is a table showing an example of a flow list applied to the first embodiment;

FIG. 9 is a table showing an example of an L2 label database;

FIG. 10 is a table showing an example of a flow list applied to the second embodiment;

FIG. 11 is a table showing an example of an L1 label database;

FIG. 14 is a table showing an example of a flow list applied to the third embodiment;

FIG. 15 is a diagram showing an example of an L2 label opposite router database;

FIG. 16 is a table showing an example of an L1 label database of an opposite edge router;

DESCRIPTION OF THE PREFERRED EMBODIMENTS

Next, the preferred embodiments of the present invention will be described with reference to the accompanying drawings. The embodiments are only illustrative but not limitative of the present invention.

Overview of Embodiments

Figure 1:
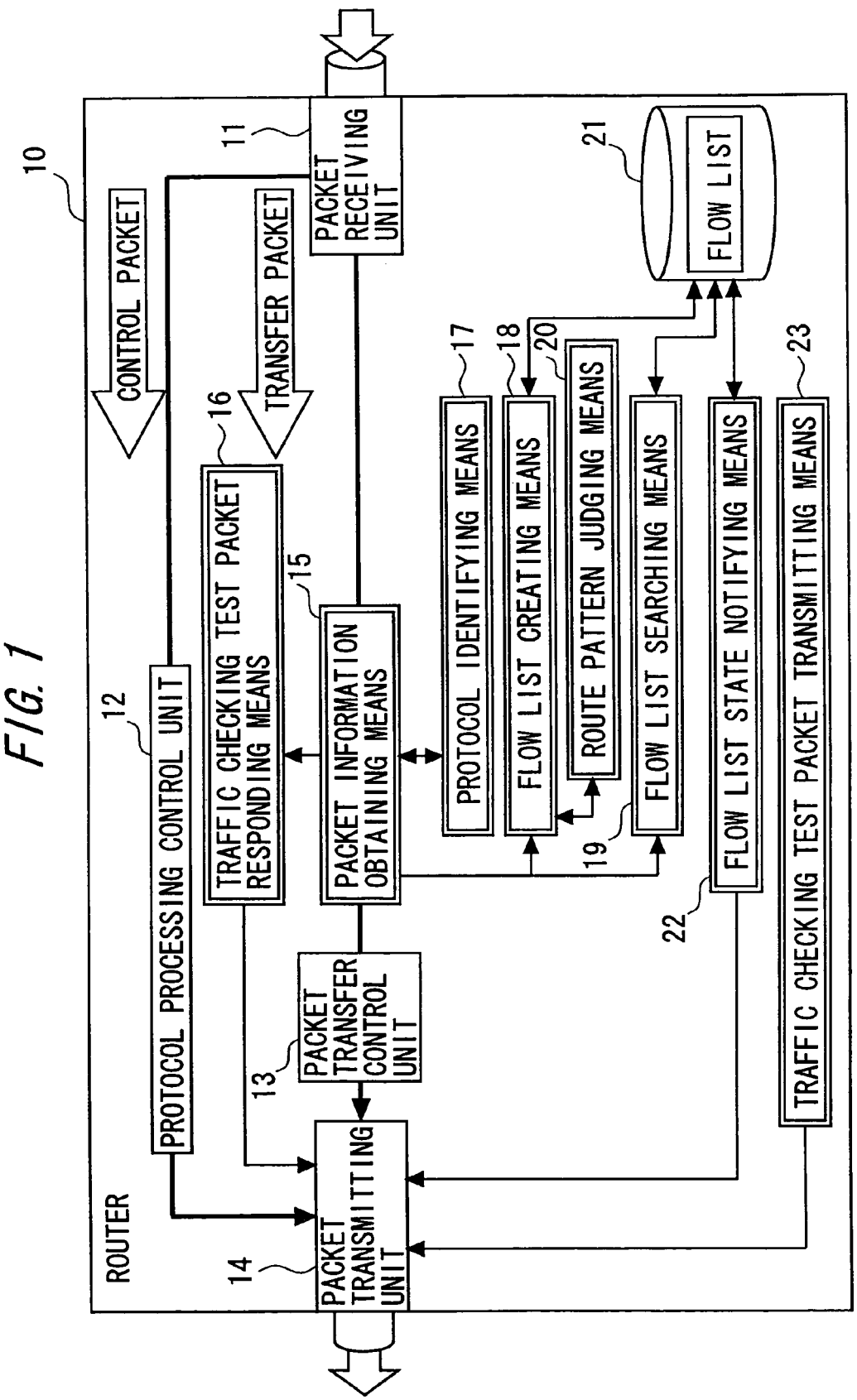
FIG. 1 is an outline explanatory diagram of an embodiment of a router according to the present invention.

FIG. 1 is a block diagram showing an embodiment of a router of the present invention. The router shown in FIG. 1 can be applied to an edge router (edge node) of a provider network which renders L2-VPN services.

In FIG. 1, a router 10 includes a packet receiving unit 11 for receiving a packet from a network, a protocol processing control unit 12 for receiving a control packet (packet of control plane) received by the packet receiving unit 11 and executing processing concerning the control plane, a packet transfer control unit 13 for receiving a transfer packet (packet of forwarding plane) received by the packet receiving unit 11 and executing processing concerning the forwarding plane, and a packet transmitting unit 14 for receiving a control packet from the protocol control unit 12 and a control packet from the packet transfer unit 13 and sending the control packets to the network.

Figure 20:
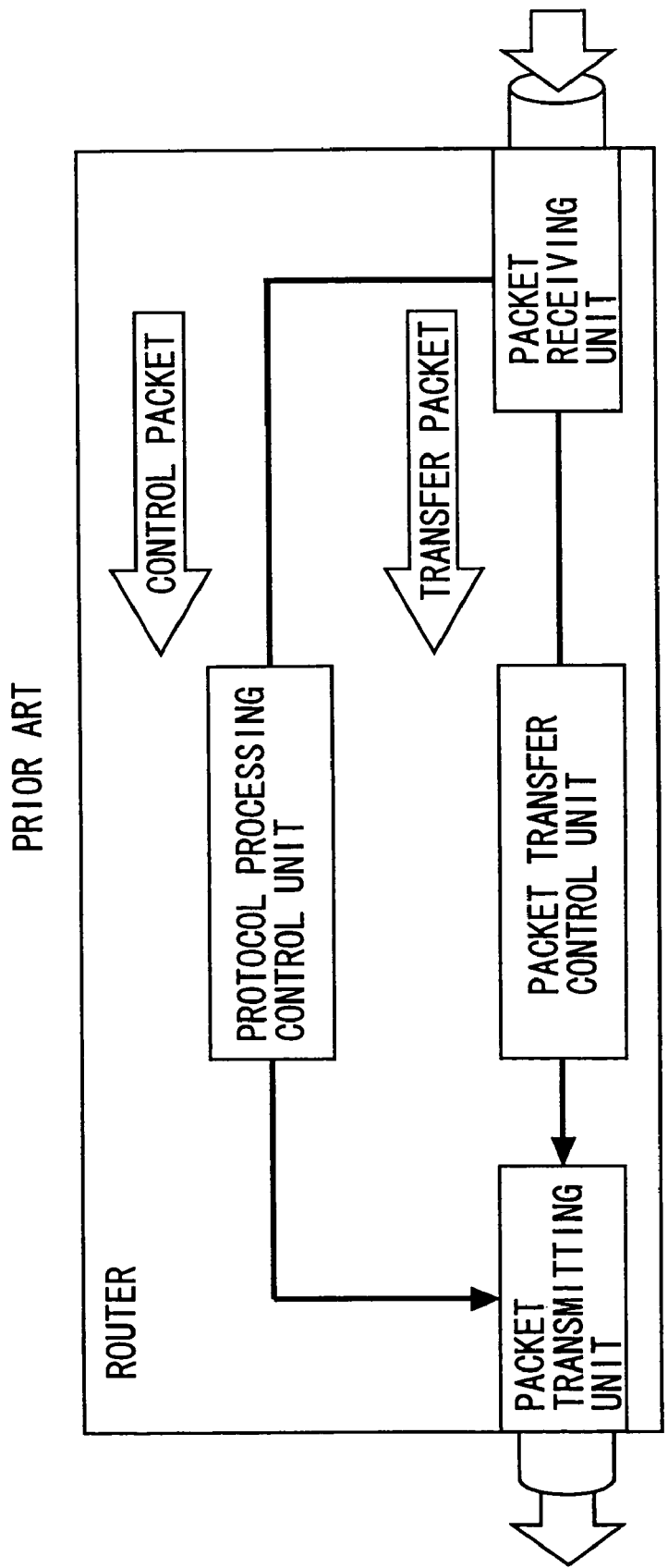
FIG. 20 is a principle diagram of a conventional router.
Figure 21:
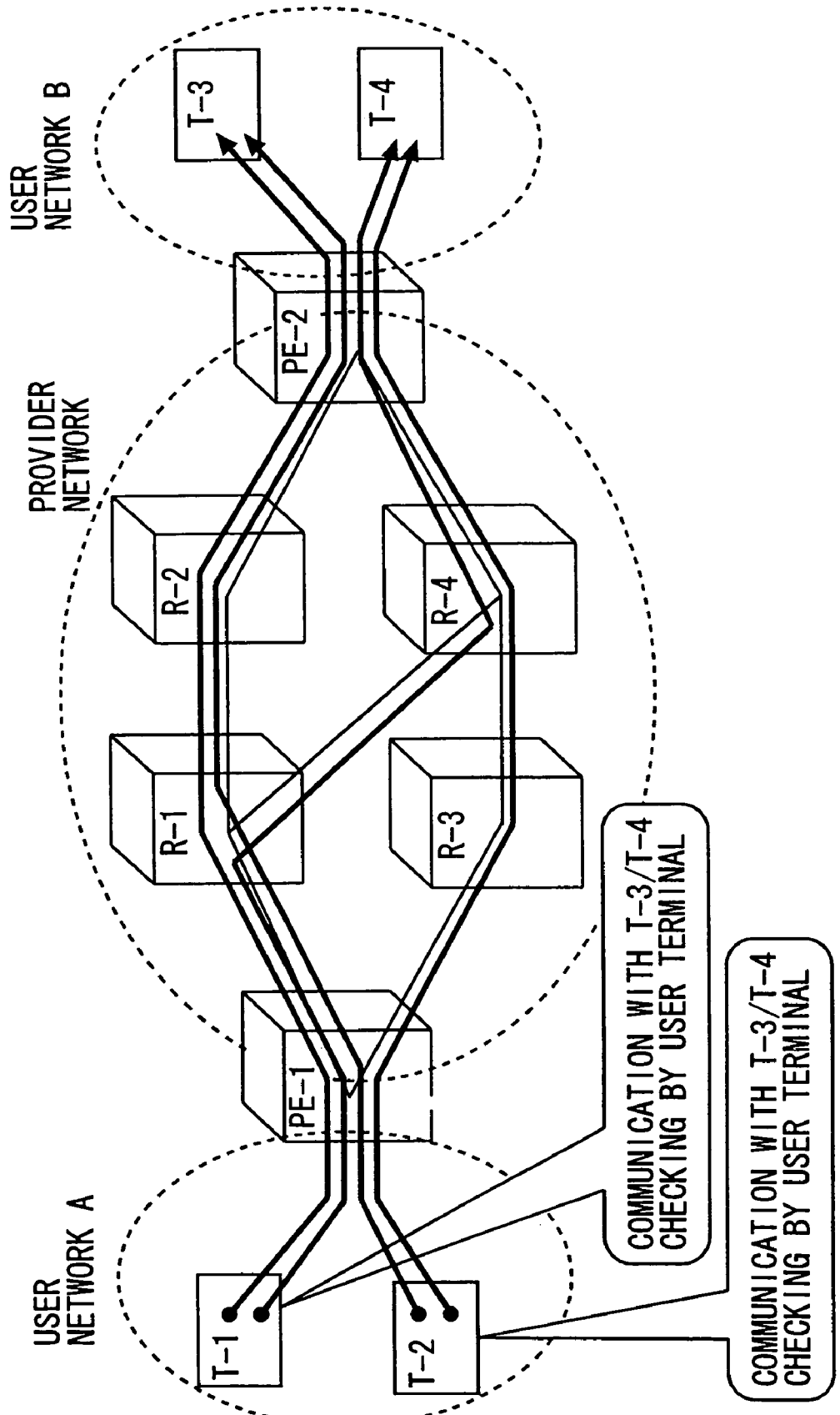
FIG. 21 is a diagram showing a conventional traffic checking system.

The packet receiving unit 11, the protocol control unit 12, the packet transfer control unit 13, and the packet transmitting unit 14 can be realized by using functions which a conventional router similar to that shown in FIG. 20 includes. The packet receiving unit 11, the packet transfer control unit 13, and the packet transmitting unit 14 function as transfer means for receiving and transferring packets transmitted between user networks.

Meanwhile, the router 10 includes novel components to realize the present invention in the following manner. In FIG. 1, the novel components are indicated by double-line blocks. The router 10 includes packet information obtaining means 15, traffic checking test packet responding means 16 connected to the packet information obtaining means 15 and the packet transmitting unit 14, and protocol identifying means 17 connected to the packet information obtaining means 15.

Additionally, the router 10 includes flow list creating means 18 connected to the packet information obtaining means 15, flow list searching means 19, and route pattern judging means 20 connected to the flow list creating means 18. The router 10 further includes a storage unit 21 of a flow list connected to the flow list creating means 18 and the flow list searching means 19.

The router 10 yet further includes flow list state notifying means 22 as output means connected to the storage unit 21, and traffic checking test packet transmitting means 23 as test packet transmitting means connected to the flow list state notifying means.

The packet information obtaining means 15 is arranged on a transfer path of transfer packets between the packet receiving unit 11 and the packet transfer control unit 13. The packet information obtaining means 15 receives a transfer packet received by the packet receiving unit 11, obtains information therefrom, and judges whether or not to continue processing.

The information in the packet is a packet MAC source address, a MAC destination address, a receiving port number, a Virtual LAN (VLAN) Tag, a label or the like. Incidentally, the transfer packet received by the packet information obtaining means 15 is passed to the packet transfer control unit 13, and sent from the packet transmitting unit 14.

The flow list creating means 18 creates, based on the information of the transfer packet obtained by the packet information obtaining means 15, a flow list in which an entry containing flow information of the packet and additional data as elements is registered. The created flow list is stored in the storage unit 21.

The flow information can contain, for example, a MAC source address and a MAC destination address of a packet transferred from the user network side to the provider network side, route pattern data indicating a transmission route of the packet in the provider network, and an L2 label compliant with an opposite edge router equivalent to an egress edge router of the packet in the provider network. On the other hand, the additional data can contain a transmission time of the packet, and state information indicating a traffic state of a packet flow.

The flow list searching means 18 searches for an entry coincident with searching conditions in the flow list stored in the storage unit 21, and updates state information in the entry. For example, when the packet information obtaining means 15 obtains information of a packet transferred from the provider network to the user network, the flow list searching means 18 searches for an entry corresponding to the information of the packet in the flow list, and sets state information in the entry to be "NORMAL" when the entry is retrieved.

The flow list state notifying means 22 refers to the flow list in the storage unit 21, and notifies a state of the flow list to a maintenance engineer of the provider network. Additionally, the flow list searching means 22 notifies an abnormal entry in which traffic is not normal for a given period of time to the maintenance engineer.

The route pattern judging means 20 judges data (route pattern) which uniquely determines a reaching path (route) from its own router to the opposite edge router based on the information in the packet received by the packet receiving unit 11.

The traffic checking test packet transmitting means 23 creates a traffic checking test packet which simulates the packet received by the packet receiving unit 11 from the user network based on the entry data of the flow list, and transmits the test packet through the packet transmitting unit 14.

When the traffic checking test packet is received by the packet receiving unit 11 of its own router, the traffic checking test packet responding means 16 creates a response test packet, and transmits it through the packet transmitting unit 14.

The protocol identifying means 17 identifies a protocol type of the packet from the information in the packet received by the packet receiving unit 11, and judges permission/non-permission of the identified protocol type.

The router 10 can perform the following first to fourth operations when it is applied to the edge router of the provider network which renders L2-VPN services.

<First Operation>

In the router 10, the packet information obtaining means 15 executes the following processing for each of all transfer packets (user packets transferred by its own router) received by the packet receiving unit 11.

That is, the packet information obtaining means 15 takes out packet flow information from the packet, and determines whether the packet is from the user network or the provider-network based on the flow information.

At this time, if the packet is from the user network, the packet information obtaining means 15 notifies the flow information to the flow list creating means 18. On the other hand, if the packet is from the provider network, the packet information obtaining means 15 notifies the flow information to the flow list searching means 19. The flow information contains data indicating a source and a destination of the packet.

The flow list creating means 18 receives, from the packet information obtaining means 15, the flow information of the packet from the user network. Then, the flow list creating means 18 creates a flow list in which an entry containing the flow information and state information of a flow is registered, and stores the flow list in the storage unit 21.

Traffic checking is started for the packet flow indicated in the entry registered in the flow list. The flow list searching means, 19 receives, from the packet information obtaining means 15, the flow information of the packet from the provider network. The flow list searching means 19 searches for an entry of a source and a destination reverse to the data of the source and the destination in the flow information in the flow list in the storage unit 21. If there is an entry coincident with searching conditions, the flow list searching means 19 sets state information of the entry to be "NORMAL".

When no communication (reception of a packet in which the source address registered in the flow list is set as a destination address, and the destination address registered in the flow list is set as a source address) occurs from a reverse direction for a given period of time or longer in the entry registered in the flow list, the flow list state notifying means 22 notifies the entry as a traffic abnormality to the maintenance engineer. The flow list state notifying means 19 can notify a state of the flow list according to a request from the maintenance engineer.

For example, the router 10 is connected to a maintenance engineer terminal (not shown) operated by the maintenance engineer of the provider network. The flow list state notifying means 22 transmits (outputs) information indicating the entry of the traffic abnormality to the maintenance engineer terminal through the packet transmitting unit 14. The maintenance engineer terminal outputs (e.g., displays) the abnormality of the entry to the maintenance engineer based on information received from the router 10. Accordingly, the maintenance engineer can recognize a flow of the abnormal traffic.

Thus, when two-way communication is normally carried out between the user terminal and the opposite user terminal, an entry of the flow list becomes normal traffic. On the other hand, even when there is communication from the user network, if no communication from a reverse direction occurs, an entry of the flow list becomes abnormal traffic.

As described above, the router 10 registers a packet flow which passes therethrough in the flow list, and checks a state of the flow registered in the flow list by monitoring a received state of a packet of a flow reverse to the flow. Accordingly, it is possible to check a traffic state of user's flow (traffic) which passes through its own router and normality of a forwarding plane of each flow by its own router only. The abnormal traffic flow is notified to the maintenance engineer. Thus, the maintenance engineer can discover a traffic abnormality in the forwarding plane early.

<Second Operation>

In the router 10, when creating a flow list based on flow information of a packet obtained by the packet information obtaining means 15, the flow list creating means 18 notifies the flow information to the route pattern judging means 20. The route pattern judging means 20 judges data (route pattern) which uniquely determines a reaching path (route) from its own router to the opposite edge router, and returns the route patter of a judging result to the flow list creating means 18.

The flow list creating means 19 creates a flow list in which the route pattern is applied to an entry index. The flow list creating means 19 registers one piece of flow information only for one route pattern. For example, when new flow information is registered in the flow list, the flow list creating means 19 does not register the new flow information in the flow list if there is an entry of a route pattern similar to that of the new flow information in the flow list.

Thus, when a plurality of flows occur by a plurality of user terminals, the router 10 executes traffic checking and state monitoring by one flow of user's for one route pattern of a forwarding plane. As a result, it is possible to prevent waste of resources of the router 10 and to reduce processing.

<Third Operation>

In the router 10, when it discovers an entry in which no communication from a reverse direction occurs for a given period of time or longer, the flow list state notifying means 22 can notify a traffic abnormality of a flow thereof to the maintenance engineer. In place of such an operation, the flow list state notifying means 22 can execute the following operation.

When it discovers an entry in which no communication from a reverse direction occurs for a given period of time or longer, the flow list state notifying means 22 notifies flow information of the entry to the traffic checking test packet transmitting means. Additionally, the flow list state notifying means 22 sets a traffic state of the entry to be on-going transmission of a traffic checking test packet. At this time, the flow list state notifying means 22 does not notify a traffic abnormality to the maintenance engineer.

Subsequently, when the router 10 cannot receive a response test packet to the test packet even after an elapse of a given period of time, the flow list state notifying means 22 judges a traffic abnormality of the flow, and notifies the traffic abnormality to the maintenance engineer.

On the other hand, upon reception of the flow information from the flow list state notifying means 22, the traffic checking test packet transmitting means 23 creates a traffic checking test packet which simulates a destination and a source from the flow information, and transmits the test packet to the provider network.

In this case, a project edge router (opposite edge router) positioned in a boundary between the opposite user network and the provider network includes a packet receiving unit 11, a protocol processing control unit 12, a packet transfer control unit 13, and a packet transmitting unit 14 similar to those shown in FIG. 1, and also at least packet information obtaining means 15 and traffic checking test packet responding means 16.

The packet information obtaining means 15 of the opposite edge router receives a traffic checking test packet received by the packet receiving unit 11 therefrom. When a packet from the packet receiving unit 11 is judged to be a traffic checking test packet, the packet information obtaining means 15 notifies information in the traffic checking test packet to the traffic checking test packet responding means 16, and discards the test packet.

The traffic checking test packet responding means 16 creates a response test packet which simulates flow information of a reverse direction based on the information of the traffic checking test packet, and transmits it to the provider network.

The packet receiving unit 11 of the router 10 receives the response test packet from the opposite edge router, and provides it to the packet information obtaining means 15. When it judges that the packet from the packet receiving unit 11 is a response test packet, the packet information obtaining means 15 notifies flow information to the flow list searching means 19, and discards the response test packet.

The flow list searching means 19 executes processing similar to that of the first operation. In other words, upon the reception of the response test packet, normal traffic of the flow is registered in the flow list.

Therefore, according to the third operation, when communication occurs only in one direction between the user terminals, or when there is no opposite user terminal, two-way communication is executed based on the test packet of the router itself. Thus, it is possible to carry out traffic checking/state monitoring of a forwarding plane used by the user, and to increase checking accuracy.

Incidentally, in the conventional router that includes no packet information obtaining means 15, the traffic checking test packet is determined to be an abnormal packet. For example, a value of Ethernet type field (ET) of the traffic checking test packet is set to 0. Normally, a packet whose ET value is 0 is judged to be abnormal.

Accordingly, when the conventional router is applied to the opposite edge router, the checking test packet is judged to be abnormal and discarded when a capsule of MPLS is removed. Thus, when the opposite router is the conventional router, no problem of flowing of a packet which uses (simulates) a destination in the traffic checking test packet to the user occurs. As a result, the router of the present invention can coexist with the edge router which has no packet information obtaining means 15, and the edge router of the provider network can be transferred to the router 10 in stages.

<Fourth Operation>

In the router 10, the packet information obtaining means 15 notifies packet information to the protocol identifying means 17 when information is obtained from a packet.

The protocol identifying means 17 identifies a protocol type from the packet information, and judges whether monitoring of the identified protocol type is permitted or not. The protocol identifying means 17 returns a result of the judgment (permission or nonpermission) to the packet information obtaining means 15.

The packet information obtaining means 15 sets a packet of a protocol message whose monitoring is permitted to be a target of processing thereafter, and executes no traffic checking for a packet of a protocol message not permitted to be monitored. In other words, the packet information obtaining means 15 sets a flow of the packet to be a monitoring target of traffic checking when the judgment result from the protocol identifying means 17 is "PERMITTED", and executes no traffic checking for the flow of the packet when the judgment result is "NONPERMITTED".

As described above, the router 10 executes traffic checking/state monitoring of a forwarding plane by targeting a protocol packet alone according to a purpose. Thus, it is possible to prevent waste of resources (effective use of resources) and to reduce processing. Moreover, it is possible to efficiently increase checking accuracy by permitting a protocol packet only in which a response occurs.

As shown in the first to fourth operations, the packet information obtaining means 15 functions as obtaining means of the present invention, the flow list creating means 18 functions as creating means of the present invention, and the flow list searing means 19 and the flow list state notifying means 22 function as monitoring means of the present invention. Additionally, the flow list searching means 19 functions as searching means of the present invention, and the flow list state notifying means 22 functions as output means (notifying means or notifying unit) of the present invention.

Furthermore, the route pattern judging means 20 functions as specifying means of the present invention, the traffic checking test packet transmitting means 23 functions as test packet transmitting means of the present invention, the traffic checking test packet responding means functions as test packet responding means of the present invention, and the protocol identifying means 17 functions as identifying means of the present invention.

Hereinafter, description will be made of an example in which the router of the present invention is used as a router to constitute an L2-VPN network, and traffic checking of a transfer function of the router and network monitoring are carried out.

First Embodiment

Figure 2:
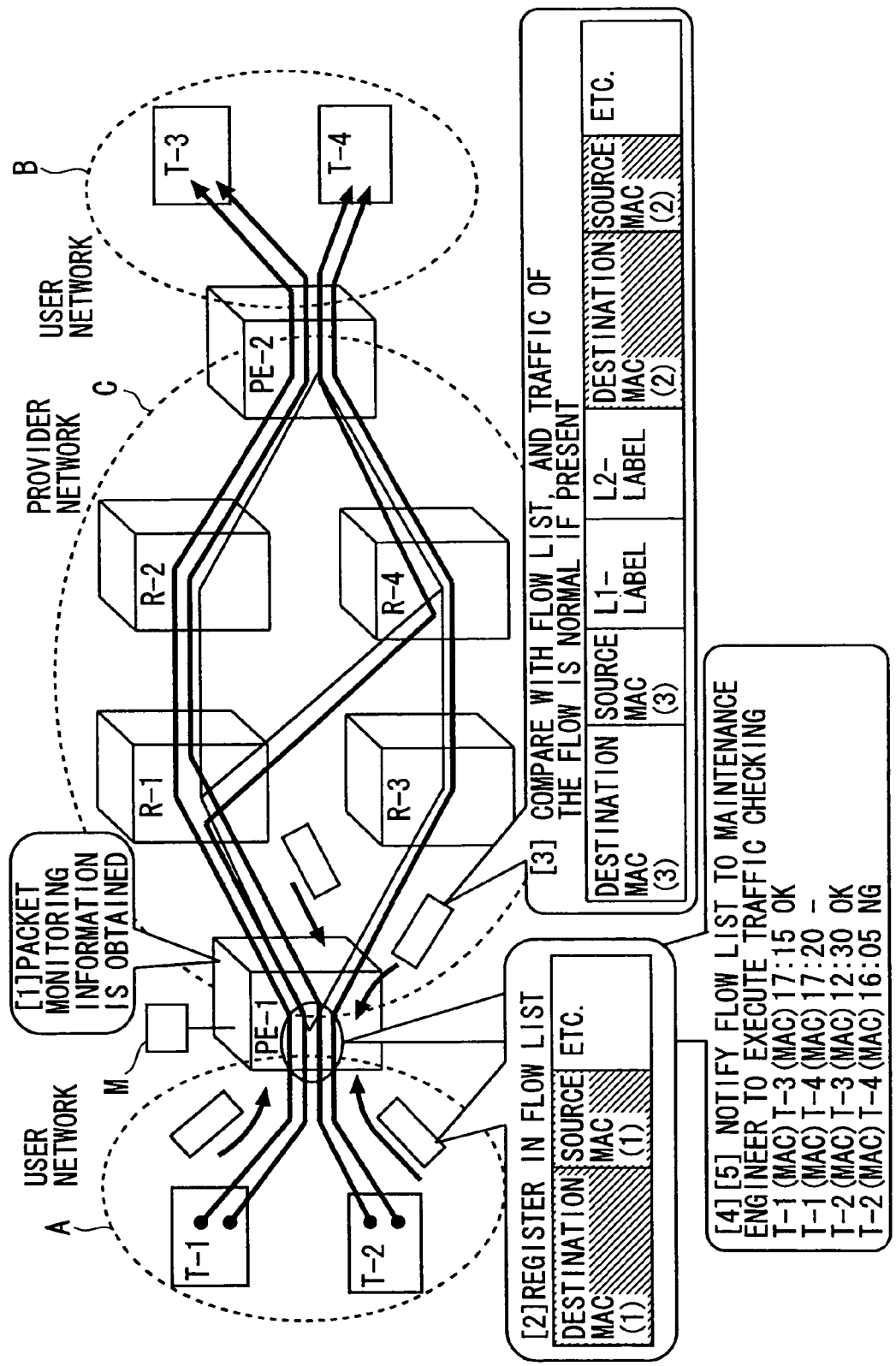
FIG. 2 is a diagram showing a traffic checking system according to a first embodiment.

FIG. 2 is a diagram showing an entire configuration of an L2-VPN network system to which a first embodiment of the present invention is applied. FIG. 2 shows a network system in which a user network A and a user network B equivalent to customer sites are connected to a provider network C which renders L2-VPN services.

The provider network C is an MPLS network, and includes Provider edge routers (simply referred to as "edge routers" hereinafter) PE-1 and PE-2 arranged in boundaries between the user networks A and B and the provider network C, and core routers R-1, R-2, R-3 and R-4 arranged between the PE-1 and the PE-2.

The core routers R-1 and R-3 are connected to the edge router PE-1 through physical lines. The core routers R-2 and R-4 are connected to the edge router PE-2 through physical lines. The core router R1 is connected to the cores routers R-2 and R-4 through physical lines. The core router R3 is connected to the core router R-4 through a physical line.

Each of the user networks A and B includes a plurality of terminal devices (or "user terminals"). In the example of FIG. 2, user terminal devices T-1 and T-2 are disposed in the user network A, and user terminals T-3 and T-4 are disposed in the user network B. The user terminals T-1 and T-2 are connected to the edge router PE-1, and the user terminals T-3 and T-4 are connected to the edge router PE-2.

When a layer 2 connection is made between the user terminals through the provider network C, the provider network C is treated as a virtual line to interconnect the user networks. For example, it is assumed that the user terminal T-1 of the user network A makes a layer 2 connection with the user terminal T-3 through the provider network C, and a packet is transferred.

In this case, the edge router PE-1 of the provider network C functions as an ingress edge router, and the edge router PE-2 functions as egress edge router. A frame (packet) addressed from the user terminal T-1 to the user terminal T-3 arrives at the edge router PE-1 as the ingress edge router.

The edge router PE-1 discovers the edge router PE-2 equivalent to the egress edge router (opposite edge router) which makes a layer 2 connection from MAC source and destination addresses of the arrived frame and identification information of VLAN (receiving port, or receiving port and VLAN-Tag), and attaches a label (referred to as "L2 label") corresponding to the edge router PE-2 to the packet.

When there are a plurality of transmission routes between the edge router PE-1 and the edge router PE-2, the edge router PE-1 determines optional one among the plurality of transmission routes, and attaches a label (referred to as "L1 label") to the packet according to an MPLS label path (Label Switching Path: LSP) pre-established on the determined transmission route. Thus, the packets from the user network A are encapsulated by the L2 and L1 labels.

Further, the edge router PE-1 attaches MAC headers to the packets encapsulated by the L2 and L1 labels to execute transfer control in the provider network C. Such packet encapsulation is carried out by the packet transfer control unit 13 in the router (see FIG. 3) Then, the encapsulated packets are sent from the packet transmitting unit 14 to the provider network C.

The encapsulated packets sent from the edge router PE-1 arrive at the opposite router PE-2 at least through one core router. Each core router has at least a constitution similar to that shown in FIG. 20.

Upon reception of the encapsulated packets by the packet receiving unit, the core router passes the encapsulated packets to the packet transfer control unit. The packet transfer control unit refers to the L2 label and the L1 label to switch the L1 label and the MAC header, and passes the encapsulated packets to the packet transmitting unit. The packet transmitting unit sends the packets to the edge router PE-2.

In the edge router PE-2, upon reception of the encapsulated packets by the packet receiving unit 11, the packet transfer control unit 13 decapsulates the encapsulated packets to remove the MAC headers and the labels. Subsequently, the decapsulated packets are passed to the packet transmitting unit 14, and transmitted to the user terminal T-3 in the user network B.

The user terminal T-3 (opposite user terminal) may send the packets to the user terminal T-1 upon packet reception from the user terminal T-1. In this case, the edge router PE-2 in the provider network C becomes an ingress edge router, and the edge router PE-1 becomes an egress edge router (opposite edge router). By an operation similar to that described above, a layer 2 connection is made between the user terminal T-3 and the user terminal T-1.

With such a constitution, the provider network C can render L2-VPN services for making a layer 2 connection between the user terminal present in the user network A and the user terminal present in the user network B.

Figure 3:
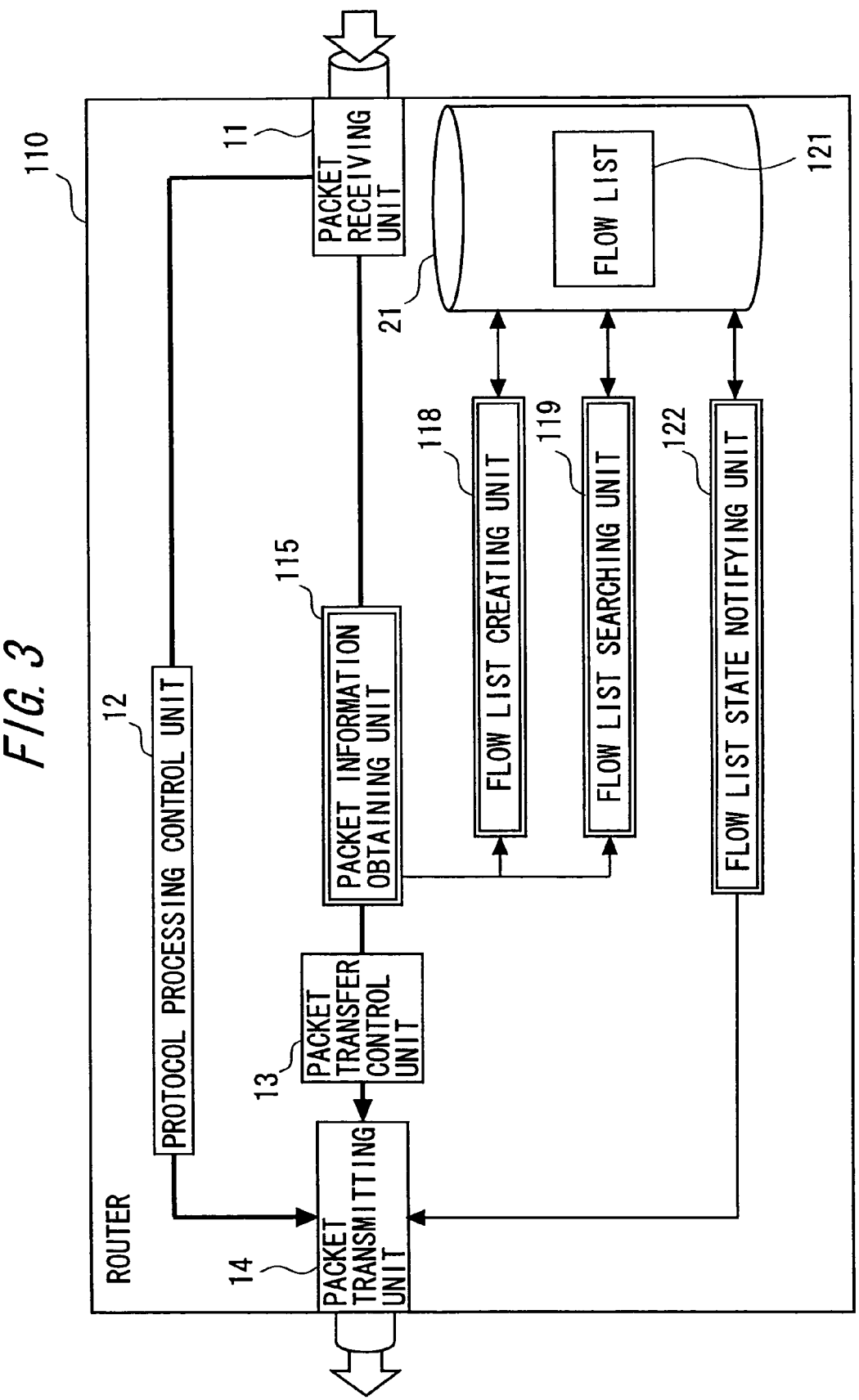
FIG. 3 is a diagram showing a constitutional example of the router of the first embodiment.

FIG. 3 is a diagram showing a constitutional example of a router 110 according to the first embodiment. The router 110 shown in FIG. 2 is applied to the edge router in the provider network C in the network system shown in FIG. 2. According to the first embodiment, however, the router 110 maybe applied to at least one of the plurality of edge routers which functions as an ingress edge router in the provider network C. For each core router, a conventional router similar to that shown in FIG. 20 can be applied.

In FIG. 3, the router 110 includes the packet receiving unit 11, the protocol processing control unit 12, the packet transfer processing unit 13 and the packet transmitting unit 14 described above with reference to the schematic explanatory diagram of FIG. 1. Further, the router 110 includes a packet information obtaining unit 115, a flow list creating unit 118, a flow list searing unit 119, a flow list state notifying unit 122 and a storage unit 21 equivalent to the packet information obtaining means 15, the flow list creating means 18, the flow list searching means 19, the flow list state notifying means 22, and the flow list storage unit 21. A flow list 121 is created in the storage unit 21. Hereinafter, mainly referring to FIGS. 2 and 3, description will be made of a method of checking a traffic state of a packet transfer function from the user terminals T-1, T-2 to the user terminals T-3, T-4 when the router 110 is applied to the edge router PE-1 in the provider network C and conventional routers are applied to the other routers. Numerals in brackets of FIG. 2 coincide with paragraph numerals described below.

[1] Packet Classification and Obtaining of MAC Address

In the edge router PE-1, the packet information obtaining unit 115 receives a packet passed through its own router (transferred by the edge router PE-1), i.e., a packet (transfer packet) of a forwarding plane from the packet receiving unit 11. Packets from the packet receiving unit 11 include a packet transferred from the user network A to the provider network C and a packet transferred from the provider network C to the user network A. The packet information obtaining unit 115 always obtains information of each packet.

Specifically, upon reception of the packet received by the packet receiving unit 11, the packet information obtaining unit 115 refers to information in the packet. At this time, when there is no label attached to the packet, the packet information obtaining unit 115 judges that the packet is from the user network A. In this case, the packet information obtaining unit 115 obtains a MAC destination address and a MAC source address in the packet as flow information (packet monitoring information). The MAC destination address and the MAC source address obtained here are equivalent to the MAC destination address (1) and the MAC source address (1) shown in FIG. 2.

On the other hand, when there is a label attached to the packet, the packet information obtaining unit 115 judges that the packet is from the provider network C. In this case, the packet information obtaining unit 115 obtains a MAC destination address and a MAC source address in the packet encapsulated by the label as flow information. The MAC destination address and the MAC source address obtained here are equivalent to the MAC destination address (2) and the MAC source address (2) in the example of FIG. 2.

[2] Reception of User Network Packet

Upon obtaining of the MAC destination address (1) and the MAC source address (1) from the user network A, the packet information obtaining unit 115 notifies the MAC addresses to the flow list creating unit 118. The flow list creating unit 118 executes processing to register an entry of the flow information in a flow list 121 created in the storage unit 21.

FIG. 4 is a table showing an example of the flow list 121 according to the first embodiment. In FIG. 4, the flow list 121 is constituted to contain an entry in which a MAC source address and a MAC destination address functioning as flow information, and a packet transmission time and state information functioning as additional data are regarded as elements. The packet transmission time may be a packet receiving time.

Upon reception of the MAC destination address (1) and the MAC source address (1) from the packet information obtaining unit 115, the flow list creating unit 118 determines whether an entry containing a group of these MAC addresses has been registered or not in the flow list 121.

In this case, if there is an entry containing a group of MAC addresses similar to that of the MAC destination address (1) and the MAC source address (1) in the flow list 121, the flow list creating unit 118 executes no processing to add the entry containing the group of these MAC addresses to the flow list 121.

On the other hand, if there is no entry containing the same group of MAC addresses, the flow list creating unit 118 adds an entry containing a group of the MAC addresses to the flow list 121, and registers a transmission time and an entry state in the entry. At this time, the flow list creating unit 118 registers "TRAFFIC IS BEING CHECKED" as an entry state. It is because no traffic checking has been executed thus far.

[3] Reception of Provider Network Packet

Upon obtaining of the MAC destination address (2) and the MAC source address (2) of the packet from the provider network C, the packet information obtaining unit 115 notifies a group of these MAX addresses to the flow list searching unit 119.

Then, the flow list searching unit 119 refers to the flow list 121 in the storage unit 21, and searches for an entry in which the MAC destination address (2) coincides with the MAC source address of the flow list 121 and the MAC source address (2) coincides with the MAC destination address of the flow list 121.

If no relevant entry is hit, the flow list searching unit 119 executes no processing. On the other hand, if a relevant entry is hit, the flow list searching unit 119 updates a state of the hit entry of the flow list 121 to be "NORMAL TRAFFIC". However, if the entry state has been "NORMAL TRAFFIC", the flow list searching unit 119 executes no processing.

A state of this time is indicated in an entry No. 1 of the flow list 121 shown in FIG. 4. In other words, the entry No. 1 indicates that traffic between user terminals having MAC source addresses (01-01-01-01-01-01) and MAC destination addresses (03-03-03-03-03-03) has been checked, and a forwarding plane has been normal.

[4] Notification of Traffic State

By the processing of the packet information obtaining unit 115, the flow list creating unit 118 and the flow list searching unit 119, contents registered in the flow list 121 of the storage unit 21 are updated as occasion demands. The flow list state notifying unit 122 can notify the contents of the flow list 121 to the maintenance engineer through a maintenance terminal M (see FIG. 2) connected to the router 110 (edge router PE-1). The maintenance engineer can check normality of a current traffic state based on a notice output from the flow list state notifying unit 122 by the maintenance engineer terminal M (displaying or the like on display).

When checking the current state through a request to the edge router PE-1, the maintenance engineer inputs a command to the edge router PE-1 form a command line interface of the maintenance engineer terminal M. For example, the maintenance engineer logs into the edge router PE-1 by using telnet, and inputs a display command of information of the flow list and information regarding a flow.

Then, according to a command from the maintenance engineer terminal M, the flow list state notifying unit 122 of the edge router PE-1 reads information of the flow list 121 from a flow list 121A, and creates information regarding a flow specified by the command from management data of the edge router PE-1. The flow list state notifying unit 122 notifies the information of the flow list and the information regarding the flow to the maintenance engineer terminal M.

Figure 5:
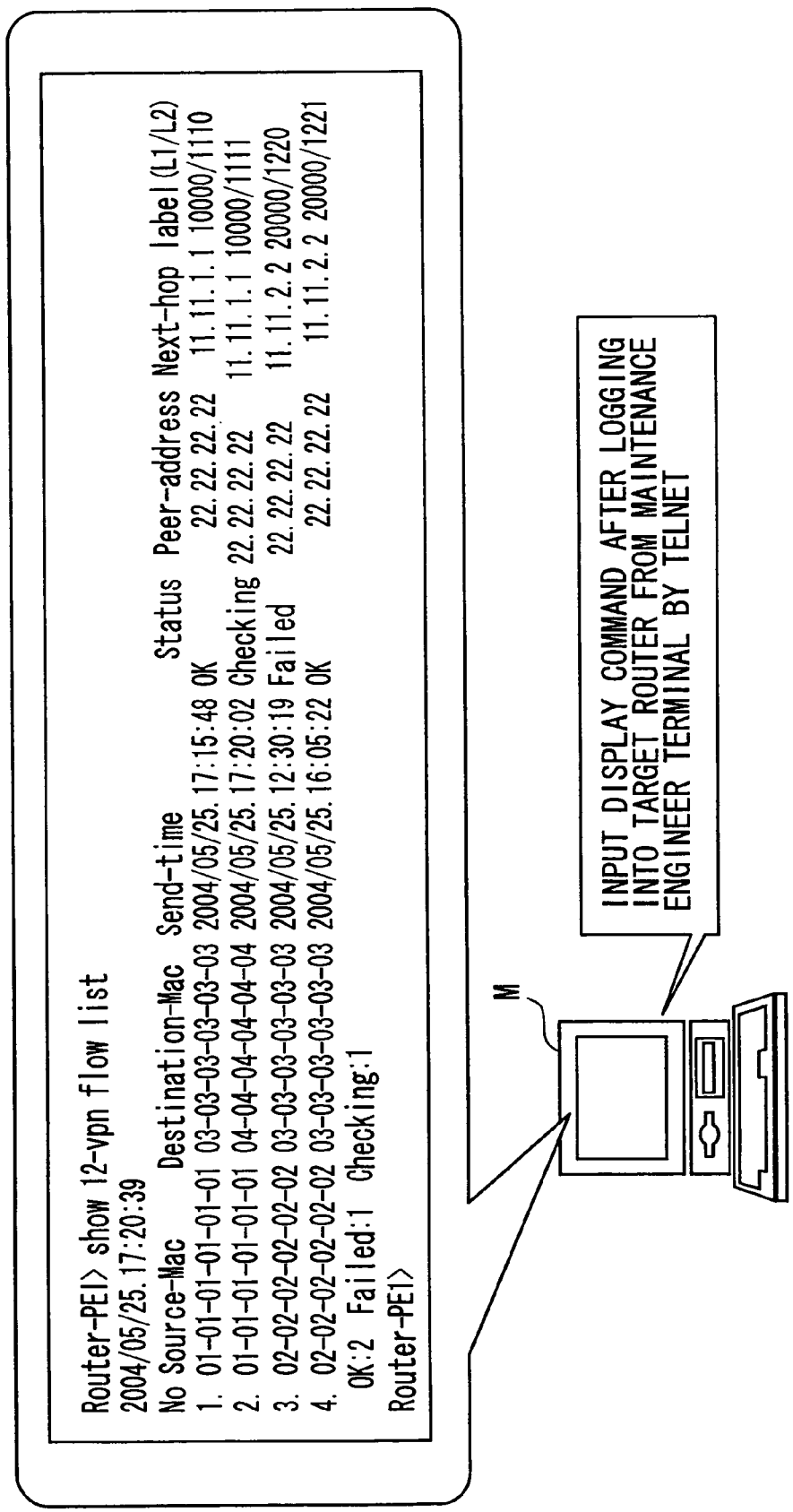
FIG. 5 is a diagram showing a notice example 1 to a maintenance engineer of a provider network.

Upon reception of the information of the flow list and the information of the flow from the edge router PE-1, the maintenance engineer terminal M displays the information on the display. FIG. 5 is a diagram showing a display example (notice example 1 to maintenance engineer) concerning the information of the flow list and the information of the flow displayed on the display of the maintenance engineer terminal M.

Alternatively, according to maintenance engineer's operation, the maintenance engineer terminal M can obtain a Management Information Base (MIB) equivalent to the information of the flow list managed by a Simple Network Management Protocol (SNMP) management terminal (not shown) from the SNMP management terminal which manages the edge router PE-1, and display it.

[5] Monitoring and Notifying of Traffic State

The flow list state notifying unit 122 searches for one of the entries of the flow list 121 whose state is "TRAFFIC IS BEING CHECKED" and in which a given period of time has elapsed from a transmission time at a constant cycle. If there is a relevant entry, the flow list state notifying unit 122 updates a state of the entry to be "ABNORMAL TRAFFIC".

This state is an entry No. 4 shown in FIG. 4. The entry No. 4 indicates that traffic between user terminals having MAC source addresses (02-02-02-02-02-02) and MAC destination addresses (04-04-04-04-04-04) of an entry has been checked to be abnormal (packet has been transmitted, but no packet of a reverse direction has been received for a given period of time).

When updating the state of the entry to "ABNORMAL TRAFFIC", the flow list state notifying unit 122 reads flow information of abnormal traffic from the flow list 121, adds information regarding a flow thereof based on the management data of the edge router PE-1, and then transmits the information to the maintenance engineer terminal M. The maintenance engineer terminal M displays the flow information and the information regarding the flow on a screen of the display.

Figure 6:
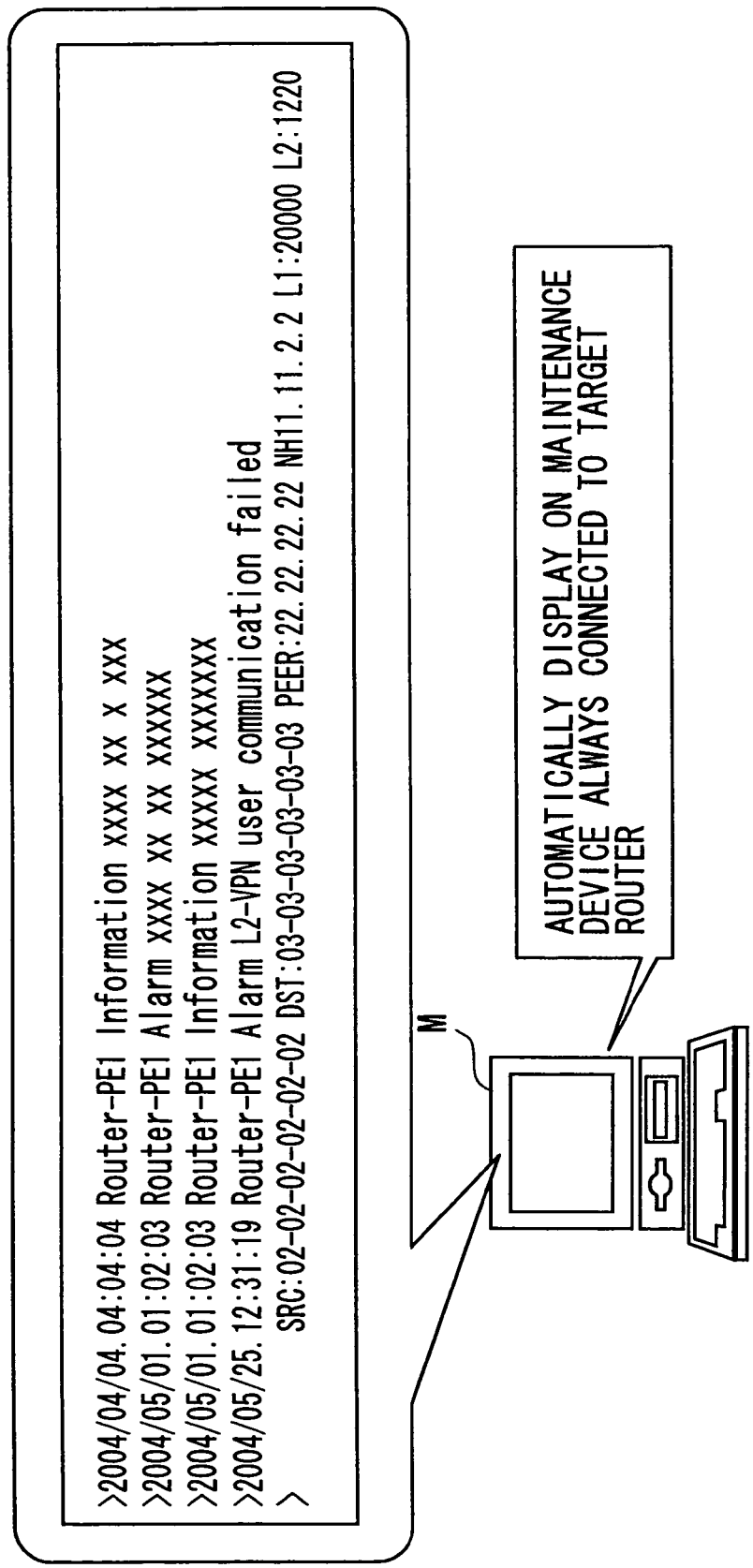
FIG. 6 is a diagram showing a notice example 2 to the maintenance engineer of the provider network.

FIG. 6 is a diagram showing a display example (notice example 2 to maintenance engineer terminal) of flow information of abnormal traffic and its related information by the maintenance engineer terminal M. Thus, when a flow of abnormal traffic occurs, flow information thereof and its related information are notified to the maintenance engineer terminal M and displayed on the screen.

Incidentally, in place of the notifying operation, when a flow of abnormal traffic occurs, the flow list state notifying unit 122 issues a Trap indicating notification of the occurrence of the flow of the abnormal traffic to an SNMP server (not shown). Accordingly, the occurrence of the flow of the abnormal traffic can be notified to the maintenance engineer.

As described above, according to the first embodiment, it is possible to check an actual traffic state of user's flow and normality of a transfer function of a used forwarding plane. Moreover, according to the first embodiment, it is possible to notify a flow in which abnormal traffic occurs to the maintenance engineer. Thus, the maintenance engineer can discover a traffic state of a flow and an abnormality of a forwarding plane early, and quickly take counter measures.

MODIFIED EXAMPLE

According to the first embodiment, when it discovers the entry of "TRAFFIC IS BEING CHECKED" in which a predetermined time has elapsed from the transmission time, the flow list state notifying unit 122 updates the state information of the entry to "ABNORMAL TRAFFIC". In place of such a constitution, the following constitution can be employed. That is, when it discovers an entry in which MAC destination and source addresses (1) are similar in the flow list 121, the flow list creating unit 118 updates a transmission time of the entry if state information of the entry is either "TRAFFIC IS BEING CHECKED" or "NORMAL TRAFFIC".

Then, the flow list state notifying unit 122 periodically monitors each entry, and searches for an entry in which a predetermined time has elapsed from the transmission time. At this time, when a relevant entry is discovered, state information of the entry is updated to be "ABNORMAL TRAFFIC". Thus, searching is possible even in a case in which a traffic state is normal at the time of starting the flow but an abnormality subsequently occurs.

Second Embodiment

Next, a second embodiment of the present invention will be described. The second embodiment includes components similar to those of the first embodiment, and thus description thereof will be omitted. Different components will be described.

Figure 7:
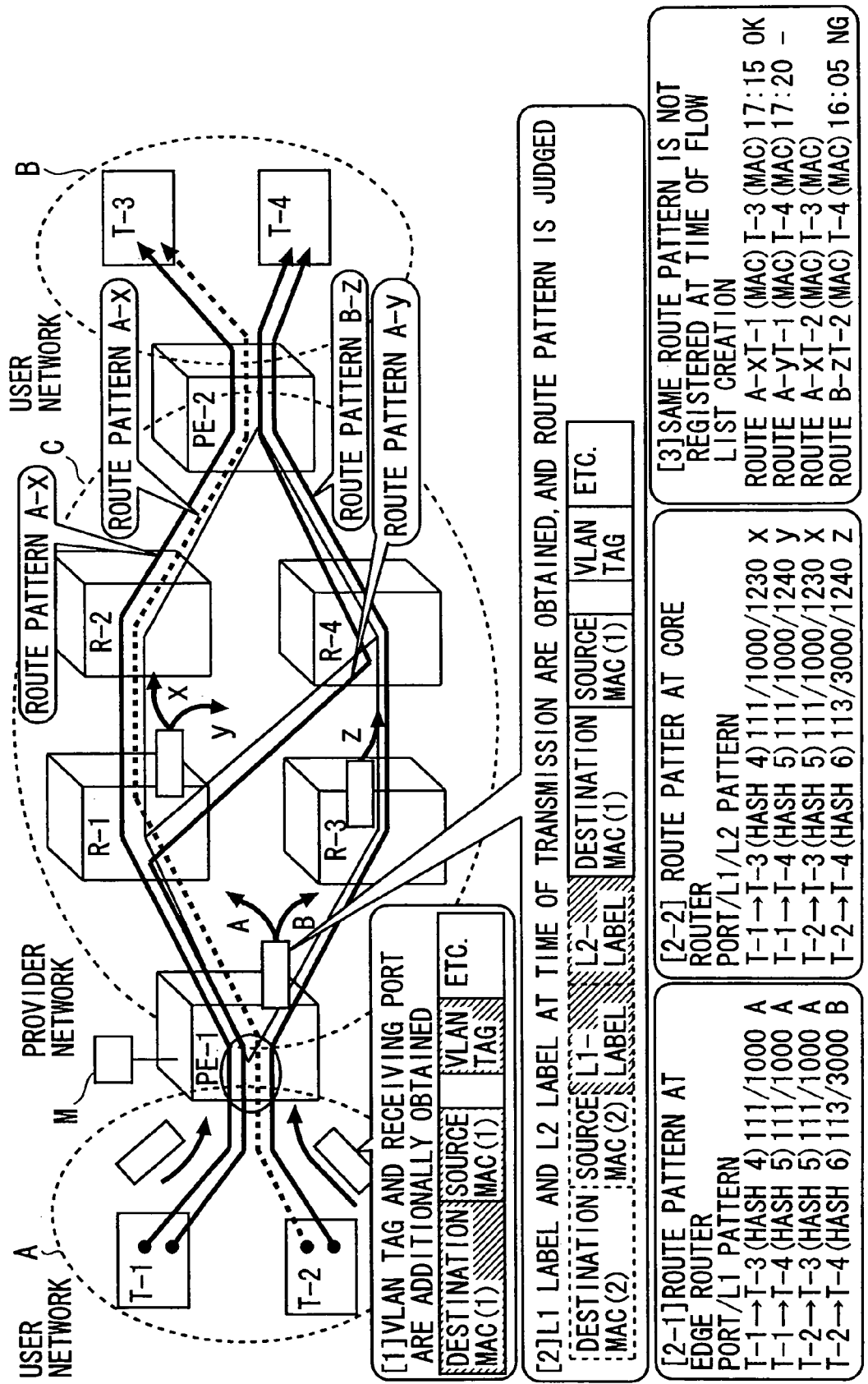
FIG. 7 is a diagram showing a traffic checking system according to a second embodiment.
Figure 8:
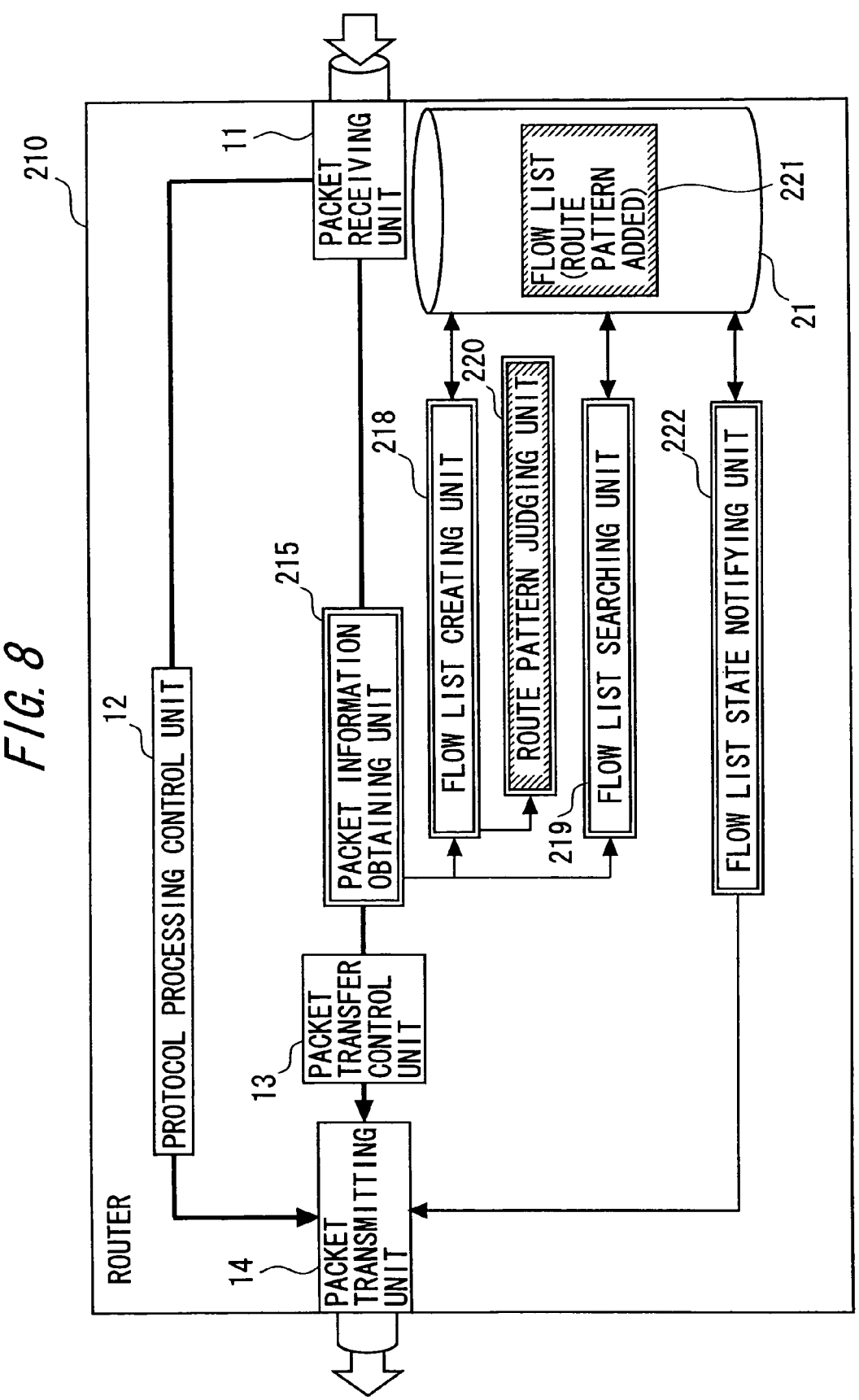
FIG. 8 is a diagram showing a constitutional example of a router according to the second embodiment.

FIG. 7 is a diagram showing an entire configuration of a network system according to the second embodiment. FIG. 8 is a diagram showing a constitutional example of a router 210 applied to the second embodiment. In FIG. 7, the configuration of the network system is similar to that of the first embodiment.

The router 210 shown in FIG. 8 includes a packet information obtaining unit 215, a flow list creating unit 218, a flow list searching unit 219, a route pattern judging unit 220, a flow list state notifying unit 222, and a storage unit 21 corresponding to the packet information obtaining means 15, the flow list creating means 18, the flow list searching means 19, the route pattern judging means 20, the flow list state notifying means 22 and the storage unit 21 shown in the schematic diagram of FIG. 1. The storage unit 21 stores a flow list 221.

The router 210 is different from the router 110 of the first embodiment in the following respects. That is, the packet information obtaining unit 215 is constituted to further obtain, with respect to a packet from a user network, a VLAN Tag value and a receiving port number thereof as flow information. The route pattern judging unit 220 is added. Further, a route pattern is added to the flow list 221 stored in the storage unit 21.

The router 210 shown in FIG. 8 is applied to at least one edge router in the network system shown in FIG. 7. The second embodiment will be described by way of case in which the router 210 is applied to an edge router PE-1, and conventional routers are applied to the other routers. Hereinafter, mainly referring to FIGS. 7 and 8, a traffic checking system of the second embodiment will be described Numerals in brackets "[ ]" of FIG. 7 coincide with numerals of paragraphs of the second embodiment. The description below will mainly focus on operations different from those of the first embodiment.

[1] Obtaining of VLAN Tag and Port Number

When it judges that a transfer packet received from a packet receiving unit 11 is a packet from a user network A, the packet information obtaining unit 215 of the edge router PE-1 obtains a MAC destination address (1) and a MAC source address (1) from the packet, and obtains a VLAN Tag value as one of pieces of flow information when it is present in the packet.

The VLAN Tag value is VLAN identification information added to the packet when Tag VLAN services are implemented, but not added in the case of Port VLAN services. Thus, this information must be obtained when Tag VLAN services are implemented.

Incidentally, the router 210 of the second embodiment can be applied to both cases in which VLAN is a Tag VLAN and VLAN is a Port VLAN. Here, an example in which VLAN is a Tag VLAN will be described.

Control information in the router is usually added by the packet receiving unit 11 to a packet received by the router. The control information contains a receiving port number of the packet. The packet information obtaining unit 215 obtains this receiving port number as one of pieces of flow information from the packet.

In the Port VLAN services, the receiving port number is used as VLAN identification information. Accordingly, when the Port VLAN services are implemented, the packet information obtaining unit 215 obtains the receiving port number of the packet as one of pieces of flow information.

The packet information obtaining unit 215 notifies the flow information obtained from the packet (i.e., MAC destination address (1), MAC source address (1), VLAN Tag value, and receiving port number) to the flow list creating unit 218. Upon reception of the flow information from the packet information obtaining unit 215, the flow list creating unit 218 notifies four pieces of data in the flow information to the route pattern judging unit 220.

Incidentally, when judging that the packet is from a provider network C, the packet information obtaining unit 215 carries out an operation similar to that of the first embodiment.

[2] Determination of Route Pattern

The route pattern judging unit 220 searches for an L2 label database stored as internal data of the router 210 based on the receiving port number and the VLAN Tag value notified from the flow list creating unit 118.

FIG. 9 is a table showing a constitutional example of the L2 label database. The L2 label database only needs be stored in the storage unit of the router 210 and, for example, can be stored in the storage unit 21. In FIG. 9, the L2 label database stores an entry containing the receiving port number, the VLAN Tag value, a VLAN-ID, an L2 label and a destination IP address of an opposite edge router as elements.

The L2 label database is constituted in such a manner that searching is executed with the receiving port number and the VLAN Tag value as keys, and a corresponding VLAN-ID, a corresponding L2 label, and a corresponding destination IP address of the opposite edge router are read.

Entry Numbers 1 to 4 of the L2 label database shown in FIG. 9 show examples of Tag VLAN described in the second embodiment. On the other hand, entry Numbers 5 and 6 show examples of Port VLAN. In the Port VLAN, since the VLAN-ID is identified by a receiving port number, the packet has no VLAN Tag value. Accordingly, an entry in this case has no VLAN Tag value.

The route pattern judging unit 220 obtains the VLAN-ID, the L2 label, and the destination IP address of the opposite edge router corresponding to the receiving port number and the VLAN Tag value from the L2 label database.

Subsequently, by using the L2 label, the destination IP address of the opposite edge router, the MAC source address, and the MAC destination address, the route pattern judging unit 220 calculates a route pattern by a route pattern calculating method (described later in detail). The route pattern judging unit 220 notifies data of the calculated route pattern to the flow list creating unit 218.

[3] Creation of Flow List (Route Pattern Addition)

With the route pattern data from the route pattern judging unit 220 as an index, the flow list creating unit 218 adds the entry containing the MAC source address, the MAC destination address, and the transmission time to a flow list 221 created in the storage unit 21. At this time, if no flow list 221 has been created in the storage unit 21, a flow list 221 is created.

FIG. 10 is a table showing a constitutional example of the flow list (route pattern addition) 221 according to the second embodiment. In FIG. 10, the flow list 221 stores an entry which contains route pattern data (transmission port number, L1 label, and L2 label), a MAC source address, a MAC destination address, a transmission time, and an entry state as elements.

When the entry is registered in the flow list 221, the flow list creating unit 218 determines whether an entry containing route pattern data similar to that in an entry to be added has been registered or not in the flow list 221.

In this case, if no entry which contains the same route pattern data has been registered, the flow list creating unit 218 registers the entry to be added in the flow list 221. On the other hand, if an entry which contains the same route pattern data has been registered, the entry to be added is not registered.

In the example of FIG. 10, since route pattern data from a user terminal T-1 to a user terminal T-3 is similar to that from a user terminal T-2 to a user terminal T-3, an entry only of one flow is added to the flow list 221. Subsequently, normality checking is carried out for each flow registered in the flow list 221.

The flow list searching unit 219 of the second embodiment executes normality checking similar to that of the flow list searching unit 119 of the first embodiment. That is, the flow list searching unit 219 searches in the flow list 221 with a MAC destination address (2) and a MAC source address (2) of a packet from a provider network C as search indexes, and executes normality checking. Other operations are similar to those of the first embodiment, and thus description thereof will be omitted.

According to the second embodiment, by monitoring flows each having only a number of actually used route patterns, it is possible to check a traffic state of each flow and normality of a transfer function of a forwarding plane. Thus, it is possible to effectively use resources of the router 210 and to reduce a load.

<Route Pattern Calculating Method>

Next, the route pattern calculating method will be described. Here, data that uniquely determines a reaching path (route) from its own router (ingress edge router) to the opposite edge router (egress edge router) is referred to as a route pattern. When route patterns are similar, routes of packets from the ingress edge router to the egress edge router become similar. However, since actual routes are limited, routes are often similar even when route patterns are different. Here, data or a data group constituting a route pattern is referred to as route pattern data.

A route to the opposite edge router is determined at each router which relays (transfers) a packet. In the case of routers that render ECMP services, one is selected from a plurality of paths for load dispersion at each router. Means for determining a selected path are different between the edge router and the core router. Thus, the two routers, i.e., the edge router and the core router, are necessary for the route pattern data. Characteristically, calculation is executed by the own edge routers for both, and a plurality of core routers are present depending on a network constitution.

Hereinafter, description will be made of a method which causes the route pattern judging unit 20 to obtain a router pattern by using "L2 LABEL", "OPPOSITE EDGE ROUTER DESTINATION IP ADDRESS", "MAC SOURCE ADDRESS", and "MAC DESTINATION ADDRESS" which are pieces of input information.

[2-1] Route Pattern Data Calculating Method of Edger Router

Path selection determination at the edge router is made based on "WHICH OPPOSITE EDGE ROUTER PATH IS DIRECTED" or "WHICH IS SELECTED WHEN THERE ARE A PLURALITY OF PATHS TO OPPOSITE EDGE ROUTER". In otherwords, the route pattern judging unit 220 determines an opposite edge router which a packet should reach and a path for sending the packet from its own router.

For example, in the example shown in FIG. 7, the edge router PE-1 has a path A for sending a packet to a core router R-1 and a path B for sending a packet to a core router R-3 as paths for passing a packet to the opposite edge router PE-2.

"WHICH OPPOSITE EDGE ROUTER PATH IS DIRECTED (OPPOSITE EDGE ROUTER which PACKET SHOULD REACH)" is determined based on "OPPOSITE EDGE ROUTER DESTINATION IP ADDRESS" of the input information. On the other hand, in the example shown in the second embodiment, "WHICH IS SELECTED WHEN THERE ARE A PLURALITY OF PATHS (PACKET SENDING PATHS)" is determined based on a hash value by hash calculation of a MAC source address and a MAC destination address of a packet. The route pattern judging unit 220 may calculate the hash value by itself, or recognize a hash value calculated by another unit of the router 210.

Upon obtaining the hash value of the IP address and MAC address of the opposite edge router, the route pattern judging unit 220 determines necessary data as internal data of the router 210 by referring to, e.g., the L1 label database stored in the storage unit 21.

FIG. 11 is a diagram showing a constitutional example of the L1 label database. In FIG. 11, the L1 label database stores an entry which contains an L1 label corresponding to a hash value of a destination IP address and an MAC address of an opposite edge router, a transmission port number, and an MAC address of a router equivalent to a next hop as elements.

Here, to send a packet to a path compliant with the hash value, a label (L1 label) compliant with the path, and an MAC address of an adjacent router positioned in a next hop of the path are necessary. However, the L1 label is a value optionally allocated by the adjacent router based on the L2 label. Accordingly, to uniformly establish a packet reaching path, a transmission port to which the adjacent router is connected must be specified.

Thus, for the route pattern data at the edge router, there are three pieces of data, i.e., "OPPOSITE EDGE ROUTER DESTINATION IP ADDRESS", "TRANSMISSION PORT", and "L1 LABEL (AT TIME OF OWN ROUTER TRANSMISSION)". However, the number of opposite edge router destination IP address is always one for a combination of the transmission port number and the L1 label. As a result, for the route pattern data at the edge router, there are two pieces of data, i.e., "TRANSMISSION PORT" and "L1 LABEL (AT TIME OF OWN ROUTER TRANSMISSION)".

For such reasons, the L1 label database is constituted in a manner that a plurality of paths corresponding to the destination IP address of the opposite edge router are selected according to a hash value, and a packet sending path is determined based on the label L1, the transmission port number, and the MAC address of the next hop router.

The route pattern judging unit 220 obtains the label L1 corresponding to the hash value of the IP address and MAC address of the opposite edge router, the transmission port number, and the MAC address of the next hop router from the L1 label database.

[2-2a] Route Pattern Data Calculating Method of Core Router

Path selection determination at the core router is made based on "WHICH OPPOSITE EDGE ROUTER PATH IS DIRECTED" and "WHICH IS SELECTED WHEN THERE ARE A PLURALITY OF PATHS" when a packet is transferred by each core router. "WHICH OPPOSITE EDGE ROUTER PATH IS DIRECTED" is similar in all core routers without any changes from an ingress edge router to an opposite (egress) edge router. Thus, "WHICH OPPOSITE EDGE ROUTER PATH IS DIRECTED" can be determined based on "OPPOSITE EDGE ROUTER DESTINATION IP ADDRESS" which is input information. "WHICH IS SELECTED WHEN THERE ARE A PLURALITY OF PATHS" is determined by using a certain calculating method based on the L1 label and the L2 label received at each core router. Concerning a path selecting method by using the core router, for example, recognition is impossible at the edge router PE-1 unless a constitution is disposed to notify the path selecting method from each core router.

However, when a packet is transferred by using the MPLS transfer function, and an L1 label and an L2 label are attached to the packet at two stages, a path is generally determined by using the L1 label and the L2 label.

The L2 label is used at the opposite edge router. Thus, values of L2 labels are equal at all the core routers. On the other hand, an L1 label value is optionally set between the routers. The L1 label is subjected to switching (L1 label value at time of reception→L1 label value at time of transmission) when a packet is transferred by each router. Accordingly, the L1 label has a value varied from core router to core router. Thus, L1 labels are present by a number equal to the number of routers through which the packet passes, and combinations of L1 labels and L2 labels are present by a number equal to the number of routers.

The edge router includes no means for judging the L1 label selected at the core router. Thus, patterning is conceivably impossible (L2, L1 (PE-1), L1 (R-1), ...). However, patterning is possible for the following reasons.

[2-2b] L1 Label Group Patterning at Plurality of Core Routers

An L1 label at the time of transmission at the core router is determined based on "WHICH IP ADDRESS PATH IS DIRECTED" and "WHICH IS SELECTED WHEN THERE ARE A PLURALITY OF PATHS". "WHICH IP ADDRESS PATH IS DIRECTED" is determined based on "OPPOSITE EDGE ROUTER DESTINATION IP ADDRESS" in input information.

"WHICH IS SELECTED WHEN THERE ARE A PLURALITY OF PATHS" is determined based on the L1 label and the L2 label at the time of reception as described above. Of those, the L2 label is "L2 LABEL" in the input information. Accordingly, an L1 label at the time of transmission at the core router is determined based on "L1 LABEL" at the time of reception if "OPPOSITE EDGE ROUTER DESTINATION IP ADDRESS" and "L2 LABEL" are similar.

Thus, when values of "OPPOSITE EDGE ROUTER DESTINATION IP ADDRESS" and "L2 LABEL" are equal, "L1 LABEL AT THE TIME OF TRANSMISSION" and "L1 LABEL AT THE TIME OF RECEPTION" are connected by one to one while numerical values are different. As a result, it is the initially attached L1 label of the ingress edge router that determines an L1 label at the time of reception at each core router.

Thus, for the route pattern data at the core route, there are four, i.e., "OPPOSITE EDGE ROUTER DESTINATION IP ADDRESS", "L2 LABEL", "TRANSMISSION PORT (OWN ROUTER (EDGE ROUTER) TRANSMISSION TIME)", and "L1 LABEL (OWN ROUTER (EDGE ROUTER) TRANSMISSION TIME)".

The number of opposite edge router destination IP addresses is always one for a combination of the transmission port and the L1 label. As a result, for the route pattern data, there are three pieces of data, i.e., "TRANSMISSION PORT (OWN ROUTER TRANSMISSION TIME)", "L1 LABEL (OWN ROUTER TRANSMISSION TIME)", and "L2 LABEL".

Therefore, as a result of calculating the route pattern data of the edge router and the route pattern data of the core router, route pattern data employed by the second embodiment become "TRANSMISSION PORT (OWN ROUTER TRANSMISSION TIME)", "L1 LABEL (OWN ROUTER TRANSMISSION TIME)", and "L2 LABEL". A combination of those pieces of data becomes a route pattern.

The route pattern judging unit 220 carries out the following operation according to the calculating method. That is, the route pattern judging unit 220 obtains a corresponding L2 label and a corresponding opposite edge router destination IP address from the L2 label database when flow information (MAC source address, MAC destination address, and VLAN Tag) is obtained from the transfer packet of the user network.

Subsequently, by using the L2 label, the opposite edge router destination IP address, the MAC source address, and the MAC destination address as input information, the route pattern judging unit 220 calculates "TRANSMISSION PORT", "L1 LABEL", and "L2 LABEL" as route patterns. Then, the flow list creating unit 218 registers "TRANSMISSION PORT", "L1 LABEL", and "L2 LABEL" of the packet obtained by the route pattern judging unit 220 as route pattern data in the flow list 221.

For such reasons, in the entry of the flow list 221 shown in FIG. 10, "TRANSMISSION PORT", "L1 LABEL", and "L2 LABEL" are registered as route pattern data.

Third Embodiment

Next, a third embodiment of the present invention will be described. The third embodiment includes components similar to those of the first and second embodiments. Thus, description of points similar to those of the first and second embodiments will be omitted, and different points will mainly be described.

Figure 12:
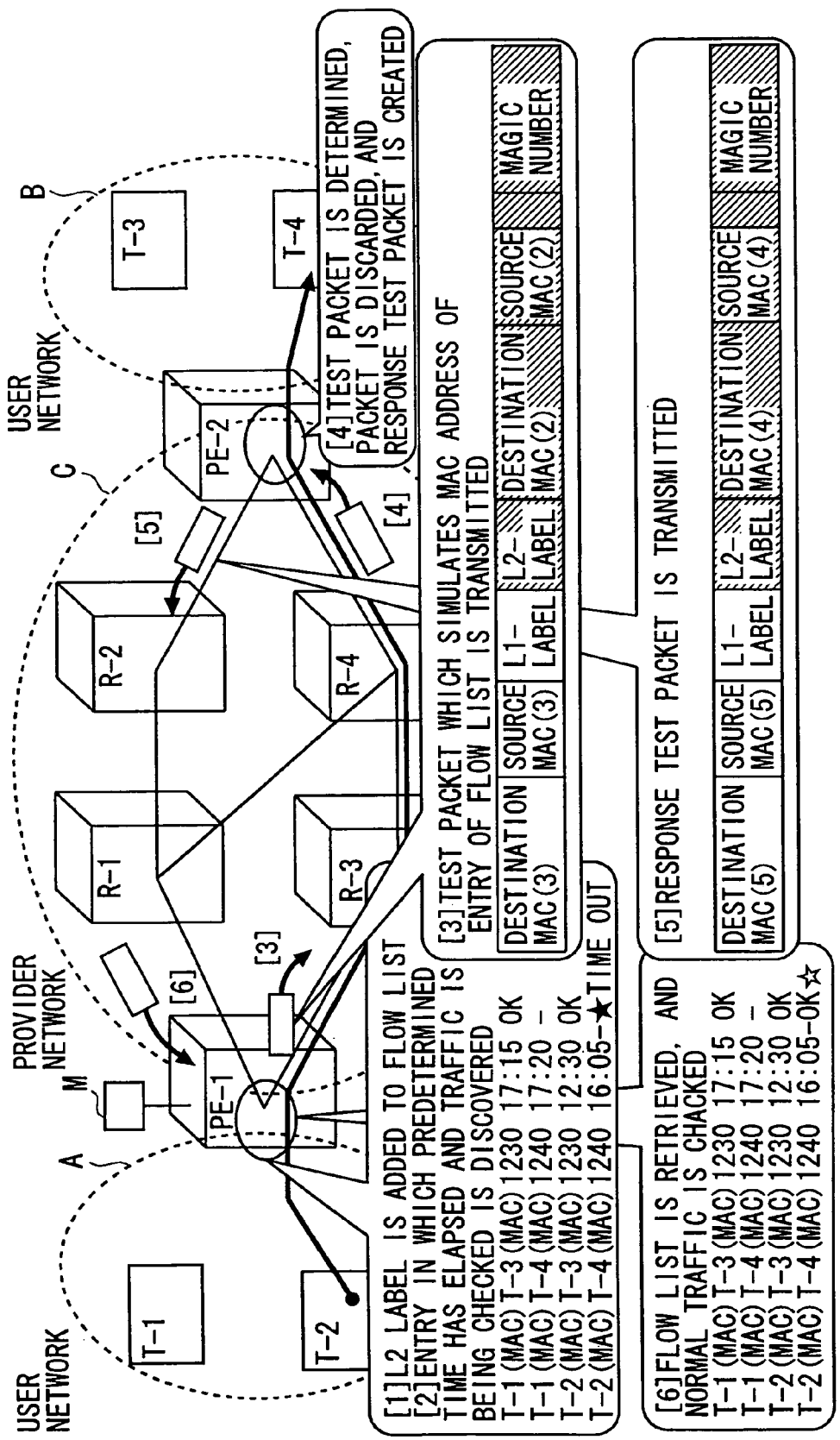
FIG. 12 is a diagram showing a traffic checking system according to a third embodiment.
Figure 13:
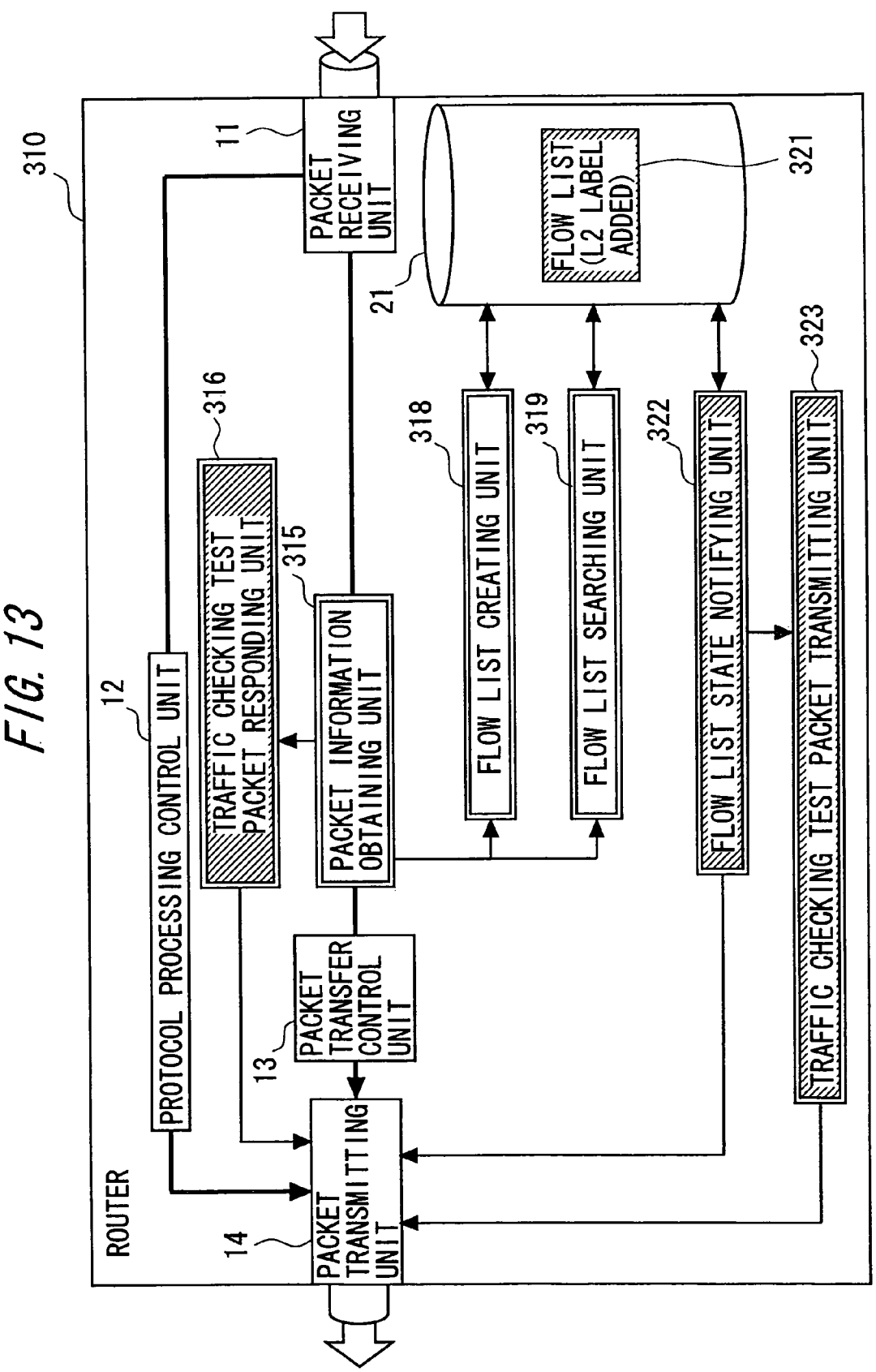
FIG. 13 is a diagram showing a constitutional example of a router according to the third embodiment.

FIG. 12 is a diagram showing an entire configuration of a network system according to the third embodiment. FIG. 13 is a diagram showing a constitutional example of a router 310 applied to the third embodiment. In FIG. 12, the configuration of the network system is similar to that of the first embodiment.

The router 310 shown in FIG. 13 includes a packet information obtaining unit 315, a flow list creating unit 318, a flow list searching unit 319, a flow list state notifying unit 322, a traffic checking test packet transmitting unit 323, a traffic checking test packet responding unit 316, and a storage unit 21 corresponding to the packet information obtaining means 15, the flow list creating means 18, the flow list searching means 19, the flow list state notifying means 22, the traffic checking test packet transmitting means 23, the traffic checking packet responding means 16, and the storage unit 21 of the router 10 shown in the schematic diagram of FIG. 1. The storage unit 21 stores a flow list 221.

The router 310 is different from the router 110 of the first embodiment in the following respects. That is, the packet information obtaining unit 315 further obtains a VLAN Tag value and a receiving port number thereof as flow information. An L2 label is further registered in each entry of the flow list 321. The traffic checking test packet transmitting unit 323, and the traffic checking test packet responding unit 316 are added.

The router 310 is applied to an ingress edge router and an egress edge router for a layer 2 connection between user networks in the provider network C. However, in the case of application to the ingress edge router, the router 310 needs not include the traffic checking test packet responding unit 316. On the other hand, in the case of application to the egress edge router, the router 310 needs not include the traffic checking test packet transmitting unit 323. In this example, it is assumed that the router 310 is applied to each of edge routers PE-1 and PE-2 shown in FIG. 12.

A conventional router (FIG. 20) can be applied to each core router of FIG. 12. Incidentally, when the conventional router is applied to the edge router PE-2, effects described below of the third embodiment cannot be obtained. However, the router 310 constituting the edge router PE-1 executes the traffic checking of the first embodiment. Thus, it is not necessary to apply the router 310 to all the edge routers of the provider network.

Hereinafter, mainly referring to FIGS. 12 and 13, a traffic checking system of the third embodiment will be described.

Numerals in brackets "[ ]" of FIG. 12 coincide with numerals of paragraphs of the third embodiment. The description below will mainly focus on operations different from those of the first embodiment.

[1] Creation of Flow List (L2 Label Addition) at Edge Router PE-1

In the edge router PE-1, when it is judged that a packet received from a packet receiving unit 11 is a packet from a user network A, the packet information obtaining unit 315 obtains a VLAN Tag value and a receiving port number in addition to a MAC destination address (1) and a MAC source address (1), and notifies them to the flow list creating unit 318. This processing is similar to that of the second embodiment.

The flow list creating unit 318 searches in an L2 label database (FIG. 9) of the router 310 based on the receiving port number and the VLAN Tag value, and obtains an L2 label attached to the packet at the time of transmission.

The flow list creating unit 318 registers an entry which contains a MAC destination address (1), a MAC source address (1) an L2 label, a transmission time, and state information in a flow list 321 of the storage unit 21.

FIG. 14 is a table showing a constitutional example of the flow list used in the third embodiment. In FIG. 14, the flow list 321 is constituted to store a corresponding L2 label in each entry. The flow list 321 is different from the flow list 121 (FIG. 4) of the first embodiment in this point. However, the L2 label registered in the flow list 321 is not used by the flow list searching unit 319.

The flow list searching unit 319 carries out an operation similar to that of the first embodiment. That is, when a packet of a direction reverse to that of each packet flow registered in the flow list 321 is received, the flow list searching unit 319 sets state information in an entry corresponding to the packet flow to be "NORMAL TRAFFIC".

[2] Periodic Monitoring of Flow List at Edge Router PE-1

In the edge router PE-1, the flow list state notifying unit 322 periodically monitors each entry registered in the flow list 321, and searches for an entry in which a transmission time has exceeded a predetermined time and state information indicates "TRAFFIC IS BEING CHECKED".

[3] Transmission of Traffic Checking Test Packet at Edge Router PE-1

When an entry of "TRAFFIC IS BEING CHECKED" in which no packet has been received from a reverse direction for a given period of time is found, the flow list state notifying unit 322 carries out the following operation different from that of the first embodiment.

The flow list state notifying unit 322 sets a state of the found entry to be "TEST PACKET IS BEING TRANSMITTED" without immediate notification to the maintenance engineer. Subsequently, the flow list state notifying unit 322 obtains a MAC destination address, a MAC source address, and an L2 label in the entry, and notifies them to the traffic checking test packet transmitting unit 323.

The traffic checking test packet transmitting unit 323 creates a traffic checking test packet which simulates user flow information from the edge router PE-1 to the edge router PE-2 (hereinafter, simply referred to as "TEST PACKET": see balloon of FIG. 12) by later-described "TRAFFIC CHECKING TEST PACKET CREATING METHOD", and transmits it through the packet transmitting unit 14.

Zero (0) is set in an Ether net type (ET) field of the test packet. A packet in which an ET field is 0 is an abnormal packet. Thus, in the opposite edge router, when a capsule of an MPLS (label) is removed (decapsulated), the packet is discarded as an abnormal packet. As a result, when the router 310 is not applied to the opposite edge router (PE-2), a problem in that the test packet is mistakenly transmitted to its MAC destination address (user) does not occur.

[4] Reception of Traffic Checking Test Packet at Edge Router PE-2

L2 and L1 labels compliant with the MAC destination and source addresses thereof are attached to the test packet (MPLS is encapsulated), and then the test packet is sent from the packet transmitting unit 14 to the provider network C. Subsequently, the test packet passes through a path controlled by the L1 label to reach the edge router PE-2 which is an opposite edge router.

[5] Transmission of Response Test Packet at Edge Router PE-2

In the edge router PE-2, the test packet received by the packet receiving unit 11 is passed to the packet information obtaining unit 315. Upon reception of the test packet, the packet information obtaining unit 315 first judges that the test packet is from the provider network because of the label addition.

In this case, the packet information obtaining unit 315 refers to the ET field and a payload of the packet to determine whether the packet is a test packet or not. At this time, if a value of the ET field is 0 (abnormal packet) and the payload contains information (e.g., magic number) indicating that the packet is a test packet, the packet information obtaining unit 315 determines that the packet is a test packet.

If the packet is judged to be a test packet, the packet information obtaining unit 315 obtains a MAC destination address, a MAC source address (equivalent to MAC destination address (2) and MAC source address (2) of FIG. 12), and an L2 label from the packet, and discards the test packet.

Then, the packet information obtaining unit 315 notifies the obtained two MAC addresses and the L2 label to the traffic checking test packet responding unit 316. At this time, the packet information obtaining unit 315 supplies the MAC destination address of the test packet as a MAC source address, and the MAC source address of the test packet as a MAC destination address.

By using the MAC destination address, the MAC source address, and the L2 label from the packet information obtaining unit 315, according to later-described "RESPONSE TEST PACKET CREATING METHOD", the traffic checking test packet responding unit 316 creates a traffic checking response test packet from the edge router PE-2 to the edger router PE-1 (hereinafter, simply referred to as "RESPONSE TEST PACKET: see balloon of FIG. 12), and transmits it through the packet transmitting unit 14.

[6] Reception of Response Test Packet, and Traffic Checking

The response test packet is received by the packet receiving unit 11 of the edge router PE-1, and passed to the packet information obtaining unit 315. Since the response test packet has been encapsulated by the label, the packet information obtaining unit 315 judges that the packet is from the provider network.

In this case, the packet information obtaining unit 315 refers to the ET field and a payload of the packet to determine whether the packet is a response test packet or not. If a value of the ET field is 0 and the payload contains information (e.g., magic number) indicating that the packet is a response test packet, the packet information obtaining unit 315 determines that the packet is a response test packet.

If the packet is a response test packet, the packet information obtaining unit 315 obtains a MAC destination address and a MAC source address (equivalent to MAC destination address (4) and MAC source address (4) of FIG. 12) as flow information from the response test packet, and notifies them to the flow list searching means 319. The packet information obtaining unit 315 discards the response test packet.

The flow list searching unit 319 carries out an operation similar to that of the first embodiment. Accordingly, state information of the corresponding entry in the flow list 321 is updated to "NORMAL TRAFFIC".

Additionally, in the edge router PE-1, the flow list state notifying unit 322 continues periodic monitoring of each entry of the flow list 321 from a state of the [1]. When the flow list state notifying unit 322 discovers a "TEST PATTERN IS BEING TRANSMITTED" entry in which no packet has been received from a reverse direction for a given period of time, the flow list state notifying unit 322 updates a state of the entry to "ABNORMAL TRAFFIC", and notifies it to the maintenance engineer.

For example, the flow list state notifying unit 322 updates the state information of the entry of "TEST PACKET IS BEING TRANSMITTED" in which an elapse of time from a transmission time of the entry (total time from when the transmission time is first registered in the entry) exceeds a predetermined time to "ABNORMAL TRAFFIC".

Alternatively, upon notification to the traffic checking test packet transmitting unit 323, the flow list state notifying unit 322 may update the state information of the corresponding entry to "TEST PACKET IS BEING TRANSMITTED", update the transmission time of the entry, and update the entry of "TEST PACKET IS BEING TRANSMITTED" in which an elapse of time from the updated transmission time exceeds a predetermined time to "ABNORMAL TRAFFIC".

Otherwise, a constitution may be adopted in which a timer to permit reception of the response test packet is started upon transmission of the test packet and, when the response test packet is not received before the timer becomes time-out, "TEST PACKET IS BEING TRANSMITTED" of the corresponding entry is updated to "ABNORMAL TRAFFIC".

The operations enable normality checking of a transfer function of a forwarding plane which uses a test packet. In other words, even when communication between the user terminals is one-way, or when there is no user terminal having a MAC destination address designated by the user terminal of the transmission side in the opposite user network, it is possible to check a traffic state of a packet flow by exchanging a test packet and a response test packet.

<Traffic Checking Test Packet Creating Method>

Next, description will be made of a method which causes the traffic checking test packet transmitting unit 323 to create a test packet from the MAC destination address, the MAC source address, and the L2 label notified from the flow list state notifying unit 322.

A balloon of [3] of FIG. 12 shows a data structure example of a test packet. The test packet has a structure in which L1 and L2 labels are attached to an MAC frame, and an MAC header is further attached. A MAC destination address (2) and a MAC source address (2) set in the header of the MAC frame are the MAC destination address and the MAC source address read from the entry of "ABNORMAL TRAFFIC".

A value (0) indicating that the test packet is an abnormal packet is written in an ET field of the header containing the MAC destination address (2) and the MAC source address (2). Information (magic number) indicating that the test packet is a traffic checking test packet is written in a payload of the MAC frame.

Based on the L2 label, the traffic checking test packet transmitting unit 323 refers to the L2 label database (FIG. 9) which is internal data of the router 310 to obtain an opposite edge router destination IP address. The L2 label database is stored in the storage area of the router 310 which the traffic checking test packet transmitting unit 323 can access.

Based on the obtained IP address, and a hash value of the MAC destination address (2) and the MAC source address (2), the traffic checking test packet transmitting unit 323 refers to the L1 label database (FIG. 11) which is internal data of the router 310 to obtain a corresponding L1 label and an MAC address of a next hop router. The L1 label database is stored in the storage area of the router 310 which the traffic checking test packet transmitting unit 323 can access.

The traffic checking test packet transmitting unit 323 attaches the L2 label obtained from the entry and the L1 label obtained from the L1 label database to the previously created MAC frame.

Further, the traffic checking test packet transmitting unit 323 attaches an MAC header in which an MAC address of a next hop router is set as a MAC destination address (3) and an MAC address of the own edge router PE-1 is set as a MAC source address (3) to the MAC frame.

Thus, the test packet is completed. The completed test packet is passed from the traffic checking test packet transmitting unit 323 to the packet transmitting unit 14. The packet transmitting unit 14 transmits the test packet from the transmission port corresponding to the L1 label to the provider network C.

<Response Test Packet Creating Method>

Next, description will be made of a method which causes the traffic checking test packet responding unit 316 to create a response test packet from the MAC destination address (MAC destination address 2)), the MAC source address (MAC source address (2)), and the L2 label of the test packet notified from the packet information obtaining unit 315.

A balloon of [5] of FIG. 12 shows a data structure example of a response test packet. As in the case of the test packet, the response test packet has a structure in which L2 and L1 labels are attached to an MAC frame, and an MAC header is further attached.

A MAC destination address (4) set in the header of the MAC frame is a MAC source address (2) of the test packet, and a MAC source address (4) is a MAC destination address (2) of the test packet. A value (0) indicating an abnormal packet is written in an ET field of the header. Information (magic number) indicating a response test packet is written in a payload of the MAC frame.

Based on the L2 label of the test packet, the traffic checking test packet responding unit 316 refers to the L2 label opposite router database which is internal data of the router 310. FIG. 15 is a table showing an example of the L2 label opposite router database.

The L2 label opposite router database registers an entry which contains an opposite edge router destination IP address corresponding to the L2 label of the test packet received by its own router, and an opposite edge router L2 label as elements. The L2 label opposite database is stored in the storage area of the router 310 which the traffic checking test packet responding unit 316 can access.

FIG. 15 shows the L2 label opposite router database held in the edge router PE-2. Specifically, an IP address of the edge router PE-1 is stored as "OPPOSITE EDGE ROUTER DESTINATION IP ADDRESS" corresponding to the L2 label (L2 label received by its own router) of the test packet from the edge router PE-1, and an L2 label corresponding to the IP address of the edge router PE-1 is stored as "OPPOSITE ROUTER TRANSMITTED L2 LABEL".

Based on the IP address, the MAC destination address (4), and the MAC source address (4) obtained from the L2 label opposite router database, the traffic checking test packet responding unit 316 refers to the L1 label database which is internal data of the router 310.

FIG. 16 is a diagram showing an example of the L1 label database held in the edge router PE-2. A structure itself of the L1 label database shown in FIG. 16 is similar to the L1 label database (PE-1) shown in FIG. 11.

The traffic checking test packet responding unit 316 obtains an L1 label corresponding to the destination IP address and the hash value of the MAC destination MAC address (4) and the MAC source address (4), and an MAC address of a next hop router from the L1 label database.

Next, the traffic checking test packet responding unit 316 attaches the L2 label obtained from the L2 label opposite router database and the L1 label obtained from the L1 label database to the previously created MAC frame.

Further, the traffic checking test packet responding unit 316 attaches an MAC header in which an MAC address of a next hop router obtained from the L1 label database is set as a MAC destination address (5) and an MAC address of its own router (edge router PE-2) is set as a MAC source address (5) to the MAC frame.

The response test packet thus completed is passed from the traffic checking test packet responding unit 316 to the packet transmitting unit 14. The packet transmitting unit 14 transmits the response test packet from the transmission port corresponding to the L1 label to the provider network C.

Fourth Embodiment

Next, a fourth embodiment of the present invention will be described. The fourth embodiment includes components similar to those of the first embodiment. Thus, description of points similar to those of the first embodiment will be omitted, and different points will mainly be described.

Figure 17:
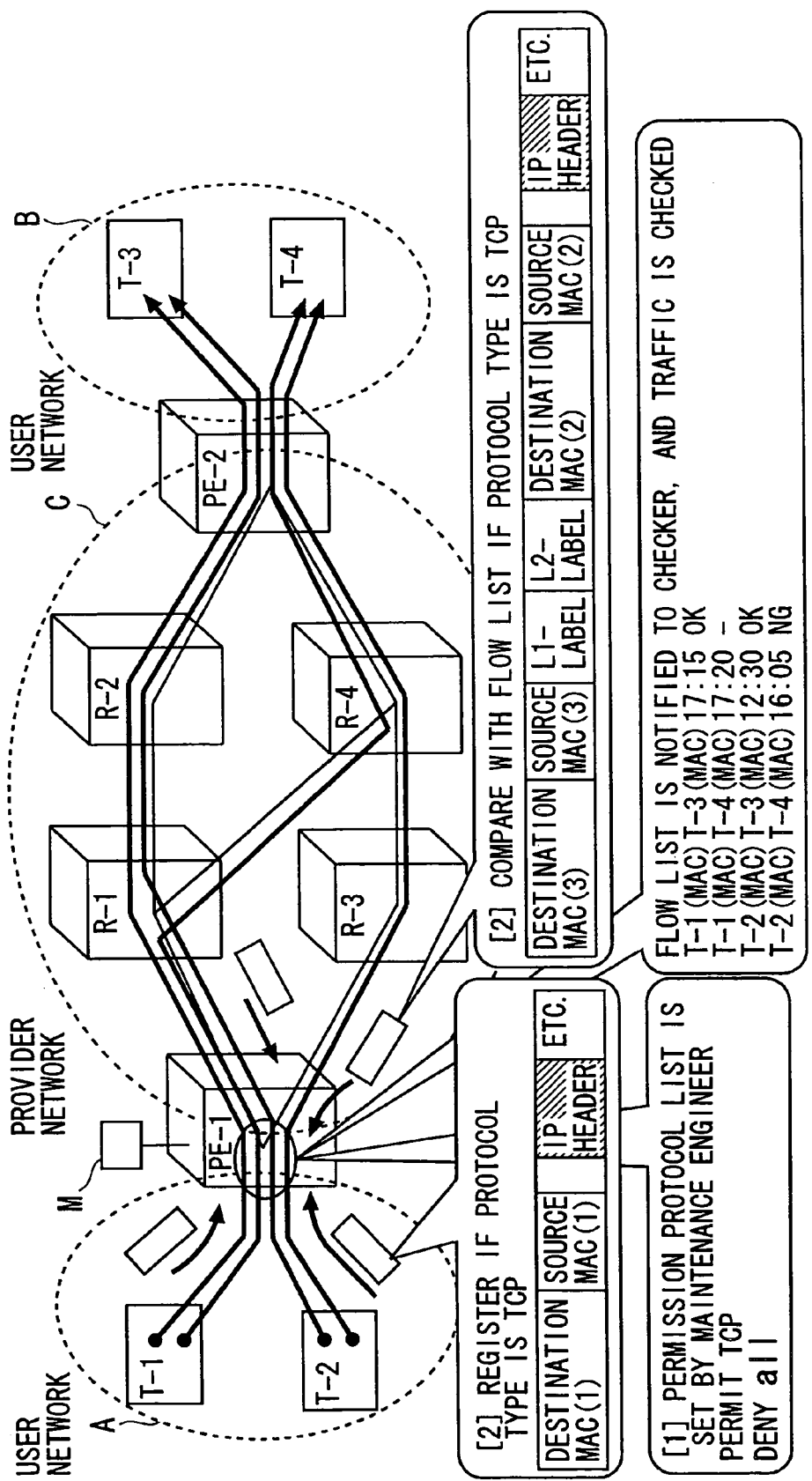
FIG. 17 is a diagram showing a traffic checking system according to a fourth embodiment.
Figure 18:
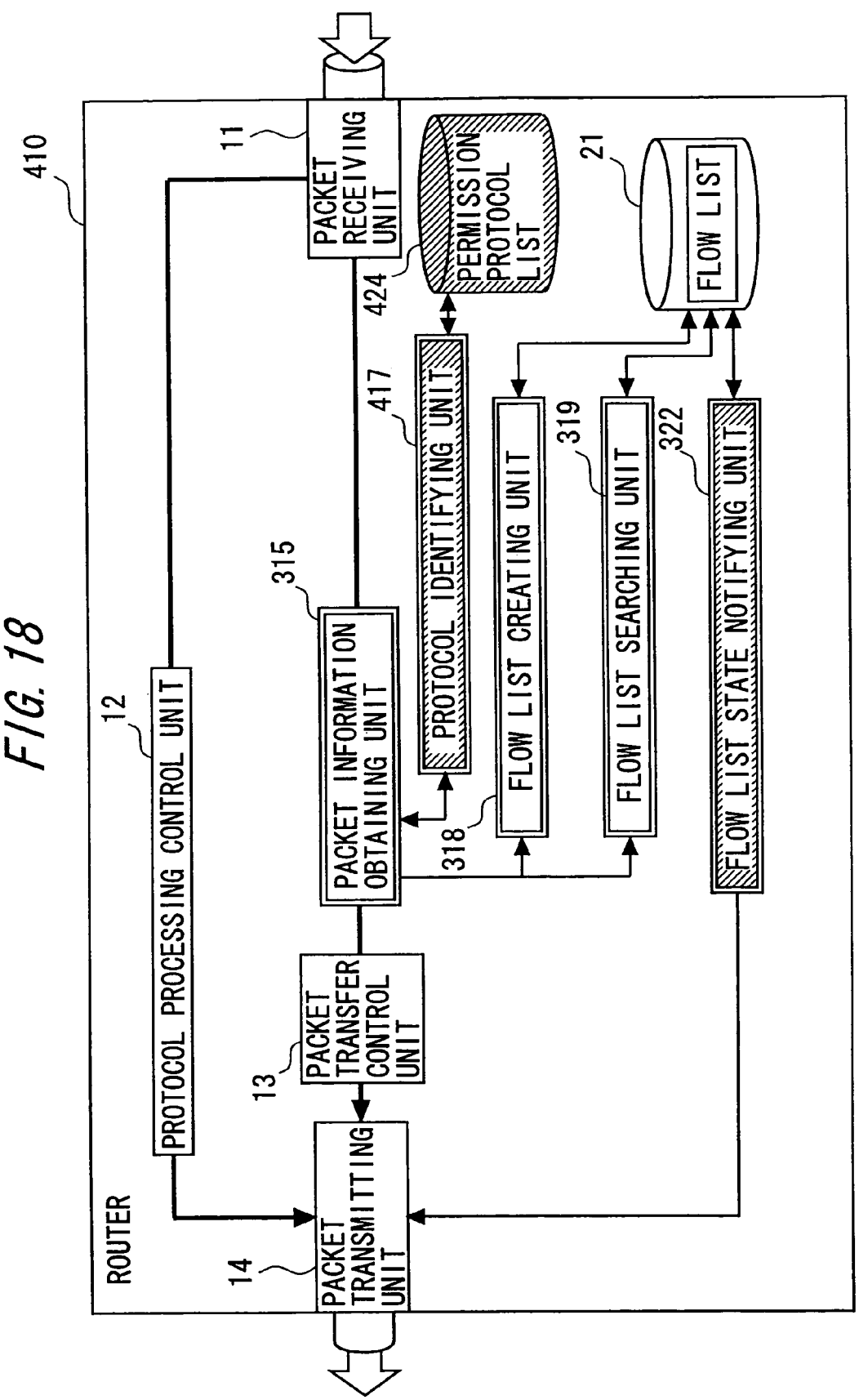
FIG. 18 is a diagram showing a constitutional example of a router according to the fourth embodiment.

FIG. 17 is a diagram showing an entire configuration of a network system according to the fourth embodiment. FIG. 18 is a diagram showing a constitutional example of a router 410 applied to the fourth embodiment. In FIG. 17, the configuration of the network system is similar to that of the first embodiment.

The router 410 shown in FIG. 18 includes a packet information obtaining unit 415, a flow list creating unit 418, a flow list searching unit 419, a flow list state notifying unit 422, a protocol identifying unit 417, and a storage unit 21 corresponding to the packet information obtaining means 15, the flow list creating means 18, the flow list searching means 19, the flow list state notifying means 22, the protocol identifying means 17, and the storage unit 21 of the router 10 shown in the schematic diagram of FIG. 1. The storage unit 21 stores a flow list. Further, the router 410 includes a permission protocol list 424 referred to by the protocol identifying unit 417. The permission protocol list 424 is stored in a storage area of the router 410 which the protocol identifying unit 417 can access.

The router 410 is different from the router 110 of the first embodiment in that the protocol identifying unit 417 and the permission protocol list 424 are added.

The router 410 is applied to at least one of a plurality of edge routers in the provider network C. In the example, it is assumed that the router 410 is applied to an edge router PE-1 shown in FIG. 17. Conventional routers (FIG. 20) can be applied to each core router and an edge router PE-2 of FIG. 17.

Hereinafter, mainly referring to FIGS. 17 and 18, a traffic checking system of the fourth embodiment will be described. Numerals in brackets "[ ]" of FIG. 17 coincide with numerals of paragraphs of the fourth embodiment. Description below will mainly focus on operations different from those of the first embodiment.

[1] Setting of Protocol Type, Permission/Nonpermission

Figure 19:
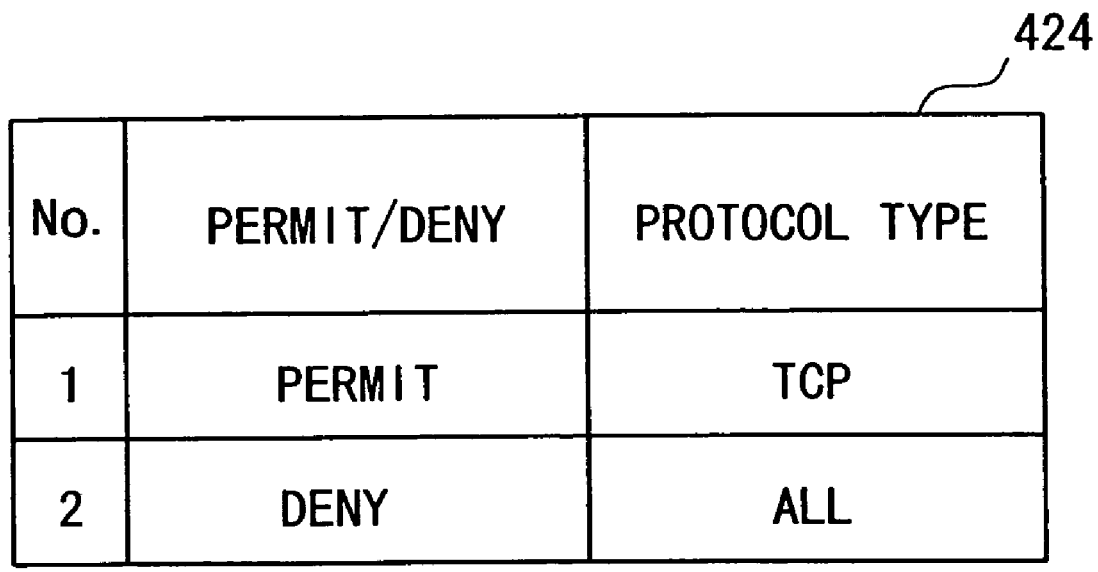
FIG. 19 is a table showing an example of a permissible protocol list.

In the storage area of the edge router PE-1 which the protocol identifying unit 417 can access, the permission protocol list 424 is created beforehand. FIG. 19 is a table showing an example of the permission protocol list.

In FIG. 19, the protocol permission list 424 is constituted to register an entry which contains an identifier indicating permission (PERMIT) /nonpermission (DENY) and a protocol type. In the example shown in FIG. 19, Transmission Control Protocol (TCP) is defined as a permissible protocol type, and all protocols excluding TCP are defined as nonpermission.

Since two-way communication occurs, the TCP is intended to efficiently carry out the traffic checking of the first embodiment. The maintenance engineer of the provider network C can set the protocol permission list 424 by using the maintenance engineer terminal M to input a maintenance command to the edge router.

[2] Obtaining of Protocol Type, and Determination of Permission/Nonpermission

In the edge router PE-1, the packet information obtaining unit 415 always obtains information on packets transferred by the edge router PE-1 (packet transferred from the user network A to the provider network (MPLS network) C, and packet transferred from the provider network C to the user network A). Upon reception of the packet, the packet information obtaining unit 415 requests the protocol identifying unit 417 to identify a protocol type of the packet.

The protocol identifying unit 417 analyzes the packet to identify its protocol type. For example, the protocol identifying unit 417 can identify a protocol type of the packet to be TCP by detecting a TCP/IP header in a payload of the MAC frame.

Further, the protocol identifying unit 417 refers to the permission protocol list 424 to judge whether the identified protocol type is permitted or nonpermitted. Then, the protocol identifying unit 417 returns a result of the judgment to the packet information obtaining unit 415.

In the case of receiving the judgment result that the protocol type is permitted, the packet information obtaining unit 415 obtains flow information from the packet, and notifies the packet to one of the flow list creating unit 418 and the flow list searching unit 419 according to a packet transfer direction. Accordingly, it is possible to check a flow traffic state of the packet by the same method as that of the first embodiment.

On the other hand, in the case of receiving the judgment result that the protocol type is nonpermitted, the packet information obtaining unit 415 passes it to the packet transfer control unit 13 without obtaining any information from the packet. Accordingly, no traffic checking is carried out for the packet. Other components and operations are similar to those of the first embodiment.

According to the fourth embodiment, traffic checking is carried out for a packet of a predesignated protocol type only. Thus, by regulating protocol types of packets, it is possible to execute traffic state checking and normality checking of a transfer function of a forwarding plane according to purposes.

Effects of the Embodiments

According to the first to fourth embodiments, it is possible to check and monitor all user flow traffic states in the L2-VPN and normality of all forwarding planes including the edge router to which the packet is transferred by using the edge router. Thus, checking by using the user terminal, external devices or expensive testing terminals are not necessary, and management cost and equipment cost used for checking and monitoring are reduced.

According to the first to fourth embodiments, even when the control plane is normal while the forwarding plane is abnormal, the maintenance engineer of the router of the provider network can immediately discover an abnormal state.

According to the second embodiment, based on checking and monitoring by a route pattern unit of a forwarding plane, it is possible to reduce resources and processing necessary for the router to which the router 210 is applied.

Additionally, according to the third embodiment, by transmitting a test packet, it is possible to check normality of a forwarding plane even in an unused state of the user. Moreover, normality checking is executed even when one-way communication only occurs, and thus checking accuracy can be increased.

Furthermore, according to the fourth embodiment, by regulating protocols, checking is efficiently executed according to user's purposes, and thus checking accuracy can be increased.

OTHERS

The embodiments of the present invention disclose claimed inventions. The claimed inventions disclosed below can be properly combined as occasion demands.

What is claimed is:

1. A provider network which includes a plurality of edge routers arranged in a boundary between user networks and provides layer 2 connection services between the user networks, at least one of the plurality of edge routers comprising:
   a transfer unit to receive a packet transmitted between the user networks and transfer the packet;
   an obtaining unit to obtain information in the packet transferred by the transfer unit;
   a creating unit to create a flow list in which flow information indicating a flow of a packet which is transferred from a user network side to a provider network side and information indicating whether a traffic state of the flow is normal are registered based on the information in the packet obtained by the obtaining unit;
   a monitoring unit to monitor a traffic state of the flow of the packet registered in the flow list based on information in a packet which is transferred from the provider network side to the user network side and registering information indicating whether the traffic state of the flow is normal in the flow list, obtained by the obtaining unit; and
   an output unit to output information indicating whether the flow traffic state of the packet registered in the flow list is normal, to an outside,
   wherein the monitoring unit includes a searching unit to search for the flow information in the flow list corresponding to the information in the packet transferred from the provider network side to the user network side, and judges a flow traffic state of the packet indicated by the flow information to be normal when the flow information is retrieved.

2. The provider network according to claim 1, wherein the monitoring unit judges a flow traffic state of the packet indicated by the flow information to be abnormal when the flow information not searched for by the searching unit for a predetermined time is present in the flow list.

3. The provider network according to claim 1, wherein when there are transmission route patterns of a plurality of packets wherein the at least one edge node of the transmission route patterns is a base point in the provider network, the creating unit registers one piece of flow information only for each transmission route pattern in the flow list.

4. The provider network according to claim 3, wherein said at least one of the plurality of edge routers further comprises a specifying unit specifying a transmission route pattern in the provider network for the flow of the packet transferred from the user network side to the provider network side, and
   wherein the creating unit receives a specifying result of a transmission route pattern corresponding to new flow information when the new flow information is registered in the flow list, and inhibits registration of the new flow information in the flow list when flow information corresponding to the same as the transmission route pattern has been already registered in the flow list.

5. The provider network according to claim 2, wherein said at least one of the plurality of edge routers further comprises a test packet transmitting unit creating, when the flow information not searched for by the searching unit for the predetermined time is present in the flow list, a test packet using the flow list and transmitting the test packet to the provider network side, and
   wherein when no response test packet corresponding to the test packet is received by the transfer unit within a predetermined time, the monitoring unit judges a flow traffic state indicated by the flow information to be abnormal.

6. The provider network according to claim 5, wherein said at least one of the plurality of edge routers further comprises a test packet responding unit creating, when a test packet is received from the provider network, a response test packet based on flow information in the test packet, and transmitting the response test packet to the provider network side.

7. The provider network according to claim 1, wherein said at least one of the plurality of edge routers further comprises an identifying unit identifying a protocol type of each packet transferred by the transfer unit, and
   wherein the creating unit creates a flow list for a packet whose protocol type identified by the identifying unit is a predetermined protocol.

8. An edge router arranged in a boundary between a provider network which renders layer 2 connection services between user networks and one of the user networks, comprising:
   a transfer unit to receive a packet transmitted between one of the user networks and the other of the user networks and transfer the packet;
   an obtaining unit to obtain information in each packet transferred by the transfer unit;
   a creating unit to create a flow list in which flow information indicating a flow of a packet which is transferred from one of the user networks to the provider network and information indicating whether a traffic state of the flow is normal are registered based on the information in the packet obtained by the obtaining unit;
   a monitoring unit to monitor a flow traffic state of the flow of the packet registered in the flow list based on information in a packet which is transferred from the provider network to one of the user networks and registering information indicating whether the traffic state of the flow is normal in the flow list, obtained by the obtaining unit; and
   an output unit to output information indicating whether the flow traffic state of the packet registered in the flow list is normal, to an outside,
   wherein the monitoring unit includes a searching unit to search for the flow information in the flow list corresponding to the information in the packet transferred from the provider network to one of the user networks, and judges a flow traffic state of the packet indicated by the flow information to be normal when the flow information is retrieved.

9. The edge router according to claim 8, wherein the monitoring unit judges a flow traffic state of the packet indicated by the flow information to be abnormal when the flow information not searched for by the searching unit for a predetermined time is present in the flow list.

10. The edge router according to claim 8, wherein when there are transmission route patterns of a plurality of packets, wherein the at least one edge node of the transmission route patterns is a base point in the provider network, the creating unit registers one piece of flow information only for each transmission route pattern in the flow list.

11. The edge router according to claim 10, further comprising a specifying unit to specify a transmission route pattern in the provider network for the flow of the packet transferred from one of the user networks to the provider network,
wherein the creating unit receives a specifying result of a transmission route pattern corresponding to new flow information when the new flow information is registered in the flow list, and inhibits registration of the new flow information in the flow list when flow information corresponding to the same as the transmission route pattern has been already registered in the flow list.

12. The edge router according to claim 9, further comprising a test packet transmitting unit creating, when the flow information not searched for by the searching unit for the predetermined time is present in the flow list, a test packet using the flow list and transmitting the test packet to the provider network side,
wherein when no response test packet corresponding to the test packet is received by the transfer unit within a predetermined time, the monitoring unit judges a flow traffic state indicated by the flow information to be abnormal.

13. The edge router according to claim 12, further comprising a test packet responding unit creating, when a test packet is received from the provider network, a response test packet based on flow information in the test packet, and transmitting the response test packet to the provider network side.

14. The edge router according to claim 8, further comprising an identifying unit identifying a protocol type of each packet transferred by the transfer unit,
wherein the creating unit creates a flow list for a packet whose protocol type identified by the identifying unit is a predetermined protocol.

15. A packet flow traffic checking method for an edge router arranged in a boundary between a provider network which renders layer 2 connection services between user networks and one of the user networks, said method comprising:
obtaining information in a transferred packet when receiving the packet transmitted between one of the user networks and the other of the user networks and transferring the packet;
creating a flow list in which flow information indicating a flow of a packet which is transferred from one of the user networks to the provider network and information indicating whether a traffic state of the flow is normal are registered based on the information in the packet;
monitoring a traffic state of the flow of the packet registered in the flow list based on information in a packet which is transferred from the provider network to one of the user networks and registering information indicating whether the traffic state of the flow is normal in the flow list; and
outputting information indicating whether the flow traffic state of the packet registered in the flow list is normal, to an outside,
wherein the monitoring includes searching for the flow information in the flow list corresponding to the information in the packet transferred from the provider network to one of the user networks, and judges a flow traffic state of the packet indicated by the flow information to be normal when the flow information is retrieved.

* * * * *